(12) United States Patent
Ye et al.

(10) Patent No.: US 10,986,370 B2
(45) Date of Patent: *Apr. 20, 2021

(54) COMBINED SCALABILITY PROCESSING FOR MULTI-LAYER VIDEO CODING

(71) Applicant: Vid Scale, Inc., Wilmington, DE (US)

(72) Inventors: Yan Ye, San Diego, CA (US); Jie Dong, San Diego, CA (US); Yuwen He, San Diego, CA (US); Ralph Neff, San Diego, CA (US)

(73) Assignee: VID SCALE, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/045,999

(22) Filed: Jul. 26, 2018

(65) Prior Publication Data

US 2019/0014348 A1 Jan. 10, 2019

Related U.S. Application Data

(63) Continuation of application No. 14/508,865, filed on Oct. 7, 2014, now Pat. No. 10,063,886.

(60) Provisional application No. 62/045,495, filed on Sep. 3, 2014, provisional application No. 61/887,782, filed on Oct. 7, 2013.

(51) Int. Cl.
*H04N 19/597* (2014.01)
*H04N 19/30* (2014.01)
*H04N 19/34* (2014.01)

(52) U.S. Cl.
CPC ........... *H04N 19/597* (2014.11); *H04N 19/30* (2014.11); *H04N 19/34* (2014.11)

(58) Field of Classification Search
USPC .................................................... 375/240.16
See application file for complete search history.

(56) References Cited

U.S. PATENT DOCUMENTS 10,063,886 B2 * 8/2018 Ye ..................... H04N 19/597
10,200,689 B2 * 2/2019 Sole Rojals ......... H04N 19/124
(Continued)

FOREIGN PATENT DOCUMENTS

| CN | 103283227 A | 9/2013 |
| JP | 2004-064629 A | 2/2004 |

(Continued)

OTHER PUBLICATIONS

Alshina et al., "AhG14: On Bit-Depth Scalability Support", Samsung Electronics, Ltd., JCTVC-N0218, Jul. 25-Aug. 2, 2013, 06 pages.
(Continued)

*Primary Examiner* — Behrooz M Senfi
(74) *Attorney, Agent, or Firm* — Condo Roccia Koptiw LLP

(57) ABSTRACT

A video coding system may perform inter-layer processing by simultaneously performing inverse tone mapping and color gamut conversion scalability processes on a base layer of a video signal. The video coding system may then perform upsampling on the processed base layer. The processed base layer may be used to code an enhancement layer. Bit depth may be considered for color gamut conversion modules. Luma and/or chroma bit depths may be aligned with respective larger or smaller bit depth values of luma and/or chroma.

26 Claims, 15 Drawing Sheets

(56) References Cited

U.S. PATENT DOCUMENTS

| | | | |
|---|---|---|---|
| 10,469,847 B2* | 11/2019 | Xiu | H04N 19/176 |
| 2003/0223634 A1 | 12/2003 | Gallagher et al. | |
| 2009/0110073 A1* | 4/2009 | Wu | H04N 19/30 |
| | | | 375/240.15 |
| 2009/0219994 A1 | 9/2009 | Tu et al. | |
| 2009/0310680 A1 | 12/2009 | Jeon et al. | |
| 2010/0020866 A1* | 1/2010 | Marpe | H04N 19/187 |
| | | | 375/240.02 |
| 2010/0046612 A1* | 2/2010 | Sun | H04N 19/149 |
| | | | 375/240.02 |
| 2010/0135393 A1* | 6/2010 | Ying Gao | H04N 19/61 |
| | | | 375/240.15 |
| 2010/0220789 A1 | 9/2010 | Yuwen et al. | |
| 2010/0260260 A1 | 10/2010 | Wiegand et al. | |
| 2011/0090959 A1 | 4/2011 | Wiegand et al. | |
| 2011/0194618 A1 | 8/2011 | Gish et al. | |
| 2012/0224774 A1* | 9/2012 | Lim | H04N 19/44 |
| | | | 382/233 |
| 2013/0321675 A1* | 12/2013 | Cote | H04N 9/64 |
| | | | 348/242 |
| 2014/0003528 A1 | 1/2014 | Tourapis | |
| 2014/0269939 A1* | 9/2014 | Guo | H04N 19/46 |
| | | | 375/240.26 |
| 2014/0355671 A1* | 12/2014 | Peng | H04N 19/115 |
| | | | 375/240.03 |
| 2015/0271509 A1* | 9/2015 | Minoo | H04N 19/33 |
| | | | 375/240.29 |
| 2015/0296232 A1 | 10/2015 | Hwang et al. | |
| 2016/0105687 A1* | 4/2016 | Deshpande | H04N 19/136 |
| | | | 375/240.25 |

FOREIGN PATENT DOCUMENTS

| | | |
|---|---|---|
| KR | 10-2012-0058379 A | 6/2012 |
| RU | 2387094 C1 | 4/2010 |
| WO | WO 2012/058394 A1 | 5/2012 |

OTHER PUBLICATIONS

Auyeung, Cheung, "Color Gamut Scalable Video Coding with Piecewise Linear Predictions", Sony Electronics Inc., JCTVC-N0271, 14th Meeting: Vienna, Austria, AT, Jul. 29-Aug. 2, 2013, 3 pages.

Bordes et al., "AHG14: Color Gamut Scalable Video Coding using 3D LUT", Technicolor, JCTVC-MQ197, 13th Meeting: Incheon, KR, Apr. 18-26, 2013, 10 pages.

Bordes et al., "AHG14: Color Gamut Scalable Video Coding using 3D LUT: New Results", Technicolor, 14th Meeting: Vienna, AT, Jul. 25-Aug. 2, 2013, 11 pages.

Bordes et al., "Color Gamut Scalable Video Coding for SHVC", IEEE, 2013 Picture Coding Symposium, Dec. 8, 2013, pp. 301-304.

Bross et al., "High Efficiency Video Coding (HEVC) Text Specification Draft 7", JCTVC-I1003, 9th Meeting: Geneva, CH, Apr. 27-May 7, 2012, 280 pages.

Chen et al., "Preliminary Version of High Efficiency Video Coding (HEVC) Scalable Extension Draft 7", JCTVC-R1008, 18th Meeting: Sapporo, JP, Jun. 30-Jul. 9, 2014, 174 pages.

Chen et al., "SHVC Draft 3", JCTVC-N1008, 14th Meeting: Vienna, AT, Jul. 25-Aug. 2, 2013, 71 pages.

Husak et al., "AHG Report on MPEG Frame-Compatible Stereoscopic Coding", ISO/IEC JTC1/SC29/WG11 m21465, Geneva, CH, Nov. 2011, 3 pages.

ISO/IEC, "Information Technology-Coding of Audio-Visual Objects—Part2: Visual", ISO/IEC 14496-2:2001(E), Dec. 1, 2001, 536 pages.

ISO/IEC, "Information Technology—Coding of Moving Pictures and Associated Audio for Digital Storage Media at up to About 1,5 Mbit/s-Part 2: Video", Ref. No. ISO/IEC 11172-2:1993/Cor. 3:2003(E), Nov. 1, 2003, 6 pages.

ISO/IEC, "Information Technology—Generic Coding of Moving Pictures and Associated Audio Information: Video", ISO/IEC 13818-2:2000(E), Dec. 15, 2000, 220 pages.

ISO/IEC, "Joint Call for Proposals on Scalable Video Coding Extensions of High Efficiency Video Coding (HEVC)", ISO/IEC JTC1/SC29/WG11 N12957, Stockholm, Sweden, N12957, Jul. 2012, 11 pages.

ITU, "Series H: Audiovisual and Multimedia Systems Coding of Moving Video-Codec for Audiovisual Services AT n ×384 kbit/s", Recommendation H.261, Nov. 1988, 14 pages.

ITU-R, "Parameter Values for the HDTV Standards for Production and International Programme Exchange", Recommendation ITU-R BT.709-6, Jun. 2015, 19 pages.

ITU-R, "Parameter Values for UHDTV Systems for Production and International Programme Exchange", ITU-R Recommendation BT.2020, Apr. 2012, 8 pages.

ITU-T, "Video Coding for Low Bit Rate Communication", Transmission of Non-Telephone Signals, ITU-T Recommendation H.263, Mar. 1996, 52 pages.

ITUT-T, "Advanced Video Coding for Generic Audiovisual Services", ITU-T Recommendation H.264, Nov. 2007, 563 pages.

Kerofsky et al., "Color Gamut Scalable Video Coding: New Results", Sharp Labs of America, JCTVC-L0334, 12th Meeting: Geneva, CH, Jan. 14-23, 2013, 17 pages.

Kerofsky et al., "Color Gamut Scalable Video Coding", IEEE 2013 Data Compression Conference, Mar. 2013, pp. 211-220.

Kerofsky et al., "Color Gamut Scalable Video Coding", JCTVC-K-0241, WG11 No. m26579, $11^{th}$ Meeting: Shanghai, CN, Oct. 10-19, 2012, 12 pages.

Luthra et al., "Requirements of the Scalable Enhancement of HEVC", ISO/IEC JTC1/SC29/WG11 N12956, Stockholm, Sweden, Jul. 2012, 12 pages.

Luthra et al., "Use Cases of the Scalable Enhancement of HEVC", ISO/IEC JTC1/SC29/WG11 N12955, Stockholm, Sweden, Jul. 2012, 08 pages.

Ohm, Jens-Rainer, "Advances in Scalable Video Coding", Institute of Communication Engineering, Aachen University of Technology, Germany, Proceedings of IEEE, vol. 93, No. 1, Jan. 2005, 15 pages.

Schwarz et al., "Overview of the Scalable Video Coding Extension of the H.264/AVC Standard", IEEE Transactions on Circuits and Systems for Video Technology, vol. 17, No. 9, Sep. 2007, 18 pages.

Segall et al., "Description of Core Experiment SCE4: Color Gamut and Bit-Depth Scalability", JCTVC-N1104, 14th Meeting: Vienna, AT, Jul. 25-Aug. 2, 2013, 5 pages.

Ugur et al., "AHG14: On Resampling & Color Gamut Scalability", JCTVC-N0146, Vienna, Austria, Jul. 2013.

Vetro et al., "Overview of the Stereo and Multiview Video Coding Extensions of the H.264/MPEG-4 AVC Standard", Mitsubishi Electric Research Laboratories, Proceedings of IEEE, Jan. 31, 2011, pp. 626-642.

Tourapis et al., "H.264/14496-10 AVC Reference Software Manual", Document: JVT-AE010, Dolby Laboratories Inc., Fraunhofer-Institute HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 90 pages.

Deshpande et al., "On Color Gamut Scalable Video Coding", JCTVC-M0214, Sharp Labs of America, Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, pp. 1-6.

Li et al., "Non-SCE3: Region Based Inter-Layer Cross-Color Filtering", JCTVC-N0229, Qualcomm Incorporated, Samsung Electronics, Ltd., Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, pp. 1-12.

Winken et al., "Bit-Depth Scalable Video Coding", IEEE International Conference on Image Processing, Sep. 2007, 4 pages.

He et al., "Non-SCE4/AHG14: Combined Bit-Depth and Color Gamut Conversion with 3D LUT for SHVC Color Gamut Scalability", JCTVC-O0161, InterDigital Communications, Inc., Joint Collaborative Team on Video Coding (JCT-VC) of ITU-T SG 16 WP 3 and ISO/IEC JTC 1/SC 29/WG 11, 15th Meeting: Geneva, CH, Oct. 23-Nov. 1, 2013, pp. 1-8.

Nakagami et al., "AHG5: Luma-Chroma Prediction for Different Bitdepth", JCTVC-P0066, Sony Corporation, Joint Collaborative

(56) References Cited

OTHER PUBLICATIONS

Team on Video Coding (JCT-VC) of ITU-T SG 16 WP 3 and ISO/IEC JTC 1/SC 29/WG 11, 16th Meeting: San Jose, US, Jan. 9-17, 2014, pp. 1-8.

* cited by examiner

| Scalability | Example |
|---|---|
| View scalability | 2D→3D (2 or more views) |
| Spatial scalability | 720p→1080p |
| Quality (SNR) scalability | 35dB→38dB |
| Temporal scalability | 30fps→60fps |
| Standards scalability | H.264/AVC→HEVC |
| Bit-depth scalability | 8-bit video → 10-/12-bit video |
| Chroma format scalability | YUV4:2:0→YUV4:2:2, YUV4:4:4 |
| Color gamut scalability | BT.709(HDTV) -> BT.2020(UHDTV) |
| Aspect ratio scalability | 4:3→16:9 |

FIG. 3

| | | High Definition | Ultra High Definition |
|---|---|---|---|
| ITU-R BT series | | BT.709-5 (part 2) | BT.2020 |
| Spatial resolution | | 1920x1080 | 7680x4320, 3840x2160 |
| Temporal | Frame rate | 60, 50, 30, 25, 24 | 120, 60, 50, 30, 25, 24 |
| | Scan | Progressive, interlaced | Progressive |
| Primary colors | Red primary | (0.640, 0.300) | (0.708, 0.292) |
| | Green primary | (0.150, 0.330) | (0.170, 0.797) |
| | Blue primary | (0.600, 0.060) | (0.131, 0.046) |
| | White point | (0.3127, 0.3290) (D65) | |
| Coding format | | 8- and 10-bit | 10- and 12-bit |

FIG. 4

UHDTV vs HDTV Color Gamuts

| Layer | Spatial resolution & frame rate | Sample bit depth | Color gamut | Scalability type |
|---|---|---|---|---|
| Layer 0 (base layer, HD format) | 1920x1080, 60fps | 8-bit/sample | BT.709 | N/A |
| Layer 1 | 3840x1960, 60fps | 8-bit/sample | BT.709 | Spatial |
| Layer 2 | 3840x1960, 60fps | 10-bit/sample | BT.709 | Bit depth |
| Layer 3 (UHD format) | 3840x1960, 60fps | 10-bit/sample | BT.2020 | Color gamut |

FIG. 6

| Layer | Spatial resolution & frame rate | Sample bit depth | Color gamut | Scalability type |
|---|---|---|---|---|
| Layer 0 (base layer, HD format) | 1920x1080, 60fps | 8-bit/sample | BT.709 | N/A |
| Layer 1 (UHD format) | 3840x1960, 60fps | 10-bit/sample | BT.2020 | Spatial, bit depth, color gamut |

FIG. 7

| Model_parameters_combined_scalability ( ) { | Descriptor |
|---|---|
| bit_depth_input_luma_minus8 | u(4) |
| bit_depth_input_chroma_delta | ue(v) |
| bit_depth_output_luma_delta | ue(v) |
| bit_depth_output_chroma_delta | ue(v) |
| CGS_method | u(v) |
| if(CGS_method == linear with gain offset) | |
|   gain_and_offset() | |
| else if(CGS method == linear with cross component) | |
|   cross_component_linear() | |
| else if(CGS method == piecewise linear) | |
|   piecewise_linear() | |
| else if(CGS method == 3D LUT) | |
|   3D_LUT() | |
| else | |
|   customized_CGS_parameters() | |
| } | |

FIG. 15

| Name of process | Index |
|---|---|
| upsampling | 0 |
| color gamut conversion | 1 |
| inverse tone mapping | 2 |
| Combined inverse tone mapping and color gamut conversion | 3 |
| Combined inverse tone mapping and upsampling | 4 |

FIG. 16

COMBINED SCALABILITY PROCESSING FOR MULTI-LAYER VIDEO CODING

CROSS REFERENCE

This application is a continuation application of U.S. Non-Provisional application Ser. No. 14/508,865, filed Oct. 7, 2014, which claims the benefit of U.S. Provisional Application No. 61/887,782 filed on Oct. 7, 2013 and U.S. Provisional Application No. 62/045,495 filed on Sep. 3, 2014, which are incorporated herein by reference as if fully set forth.

BACKGROUND

As digital display technology evolves, display resolutions continue to increase. For example, the high definition (HD) digital video streams that recently embodied the best commercial display resolution available, are poised to be eclipsed by ultra high definition (UHD) displays (e.g., 4K displays, 8K displays, and so on).

Video coding systems are often used to compress digital video signals, for instance, to reduce storage space consumed and/or to reduce transmission bandwidth consumption associated with such signals. Scalable video coding (SVC) has been shown to improve the quality of experience for video applications running on devices with different capabilities, over heterogeneous networks. Scalable video coding may consume fewer resources (e.g., communications network bandwidth, storage, etc.), when compared to non-scalable video coding techniques.

Known SVC video coding implementations (e.g., that employ spatial scalability) have proven to be effective for the coding of HD video signals, but exhibit shortcomings when processing digital video signals that extend beyond HD resolution, for example UHD video signals.

SUMMARY

A video coding system may perform inter-layer processing. The video coding system may simultaneously perform inverse tone mapping and color gamut conversion scalability processes on a video signal layer of a video signal. The video coding system may perform upsampling on the video signal layer. For example, the upsampling process may be performed after the combined inverse tone mapping and color gamut conversion scalability processes. Coding may include encoding and/or decoding as used herein.

For example, a combined processing module may be used to simultaneously perform inverse tone mapping and color gamut conversion scalability processes on a lower layer such as a base layer. The combined processing module may take a sample bit depth of an input luma component and a sample bit depth of input chroma component(s) as input and may calculate a sample bit depth of an output luma component and a sample bit depth of output chroma component(s) based on the input. The output (e.g., video comprising the output luma component and output chroma components), and/or an indication of the output (e.g. one or more parameters indicating the sample bit depths of the output luma and chroma components), and/or an indication of the output, of the combined processing module may be sent to an upsampling processing module for upsampling. The processed base layer may be used to code an enhancement layer. The processed base layer may be used to predict an enhancement layer.

The video coding system may perform color conversion from a first color space to a second color space. For example, color component values, such as luma component and/or chroma component(s), for a pixel may be retrieved. The color component values may be represented at different bit depths. The bit depths may be aligned, and the color component values may be converted from the first color space to the second color space using a cross-color component model. The alignment may be based on an input luma bit depth, an input chroma bit depth, a minimum input bit depth, and/or a maximum input bit depth. The bit depths may be aligned with the larger value of the bit depths, and/or may be aligned with the smaller value of the bit depths. When performing color mapping for a chroma component of the video signal, the bit depth of the luma component of the video signal may be aligned to the bit depth of the chroma component. When performing color mapping for a luma component of the video signal, the bit depth of the chroma component of the video signal may be aligned to the bit depth of the luma components.

BRIEF DESCRIPTION OF THE DRAWINGS

FIG. 3 is a table of example scalability types that may be performed in video coding.

FIG. 4 is a table of ultra high definition television (UHDTV) and high definition television (HDTV) technical specifications.

FIG. 6 is a table depicting an example of bitstream layers that may support HD to UHD scalability.

FIG. 7 is table depicting another example of bitstream layers that may support HD to UHD scalability.

FIG. 15 is a syntax table that illustrates an example of combined color gamut conversion and inverse tone mapping processing.

FIG. 16 is a table of example values that may be used with the example syntax table of FIG. 11.

DETAILED DESCRIPTION

Figure 1:
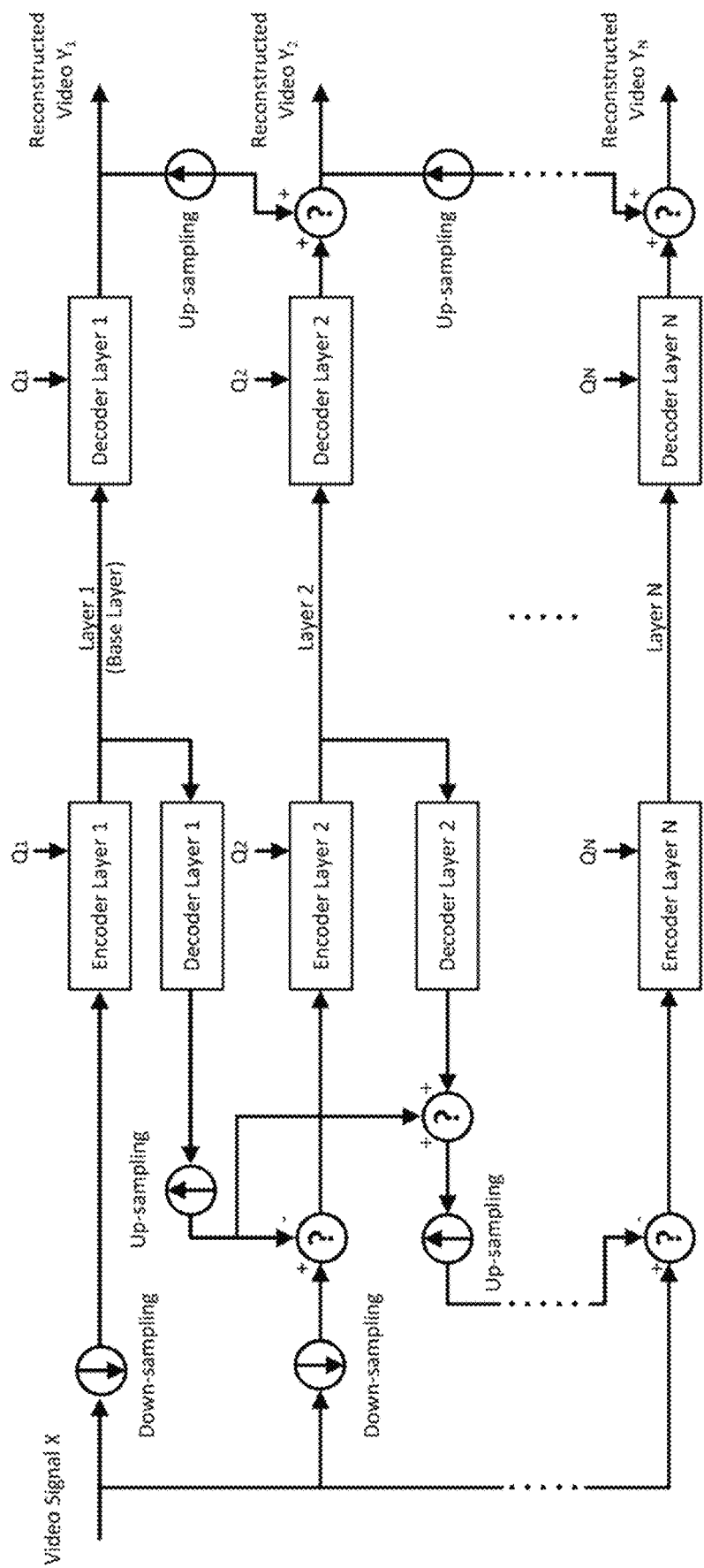
FIG. 1 depicts an example multi-layer scalable video coding system.

FIG. 1 is a simplified block diagram depicting an example block-based, hybrid scalable video coding (SVC) system. A spatial and/or temporal signal resolution to be represented by the layer 1 (e.g., base layer) may be generated by downsampling of the input video signal. In a subsequent encoding stage, a setting of the quantizer such as Q1 may lead to a quality level of the base information. One or more subsequent, higher layer(s) may be encoded and/or decoded using the base-layer reconstruction Y1, which may represent an approximation of higher layer resolution levels. An upsampling unit may perform upsampling of the base layer reconstruction signal to a resolution of layer-2. Downsampling and/or upsampling may be performed throughout a plurality of layers (e.g., for N layers, layers 1, 2 . . . N). Downsampling and/or upsampling ratios may be different, for example depending on a dimension of a scalability between two layers.

In the example scalable video coding system of FIG. 1, for a given higher layer n (e.g., 2≤n≤N, N being the total number of layers), a differential signal may be generated by subtracting an upsampled lower layer signal (e.g., layer n−1 signal) from a current layer n signal. This differential signal may be encoded. If respective video signals represented by two layers, n1 and n2, have the same spatial resolution, corresponding downsampling and/or upsampling operations may be bypassed. A given layer n (e.g., 1≤n≤N), or a plurality of layers, may be decoded without using decoded information from higher layers.

Relying on the coding of a residual signal (e.g., a differential signal between two layers) for layers other than the base layer, for example using the example SVC system of FIG. 1, may cause visual artifacts. Such visual artifacts may be due to, for example, quantization and/or normalization of the residual signal to restrict its dynamic range, and/or quantization performed during coding of the residual. One or more higher layer encoders may adopt motion estimation and/or motion compensated prediction as respective encoding modes. Motion estimation and/or compensation in a residual signal may be different from conventional motion estimation, and may be prone to visual artifacts. In order to reduce (e.g., minimize) the occurrence of visual artifacts, a more sophisticated residual quantization may be implemented, for example along with a joint quantization process that may include both quantization and/or normalization of the residual signal to restrict its dynamic range and quantization performed during coding of the residual.

Scalable video coding may enable the transmission and decoding of partial bitstreams. This may enable SVC to provide video services with lower temporal and/or spatial resolutions or reduced fidelity, while retaining a relatively high reconstruction quality (e.g., given respective rates of the partial bitstreams). SVC may be implemented with single loop decoding, such that an SVC decoder may set up one motion compensation loop at a layer being decoded, and may not set up motion compensation loops at one or more other lower layers. For example, a bitstream may include two layers, including a first layer (e.g., layer 1) that may be a base layer and a second layer (e.g., layer 2) that may be an enhancement layer. When such an SVC decoder reconstructs layer 2 video, the setup of a decoded picture buffer and motion compensated prediction may be limited to layer 2. In such an implementation of SVC, respective reference pictures from lower layers may not be fully reconstructed, which may reduce computational complexity and/or memory consumption at the decoder.

Single loop decoding may be achieved by constrained inter-layer texture prediction, where, for a current block in a given layer, spatial texture prediction from a lower layer may be permitted if a corresponding low layer block is coded in intra mode. This may be referred to as restricted intra prediction. When a lower layer block is coded in intra mode, it may be reconstructed without motion compensation operations and/or a decoded picture buffer.

SVC may employ one or more additional inter-layer prediction techniques such as motion vector prediction, residual prediction, mode prediction, etc. from one or more lower layers. This may improve rate-distortion efficiency of an enhancement layer. An SVC implementation with single loop decoding may exhibit reduced computational complexity and/or reduced memory consumption at the decoder, and may exhibit increased implementation complexity, for example due to reliance on block-level inter-layer prediction. To compensate for a performance penalty that may be incurred by imposing a single loop decoding constraint, encoder design and computation complexity may be increased to achieve desired performance. Coding of interlaced content may not be supported by SVC.

Multi-view video coding (MVC) may provide view scalability. In an example of view scalability, a base layer bitstream may be decoded to reconstruct a conventional two dimensional (2D) video, and one or more additional enhancement layers may be decoded to reconstruct other view representations of the same video signal. When such views are combined together and displayed by a three dimensional (3D) display, 3D video with proper depth perception may be produced.

Figure 2:
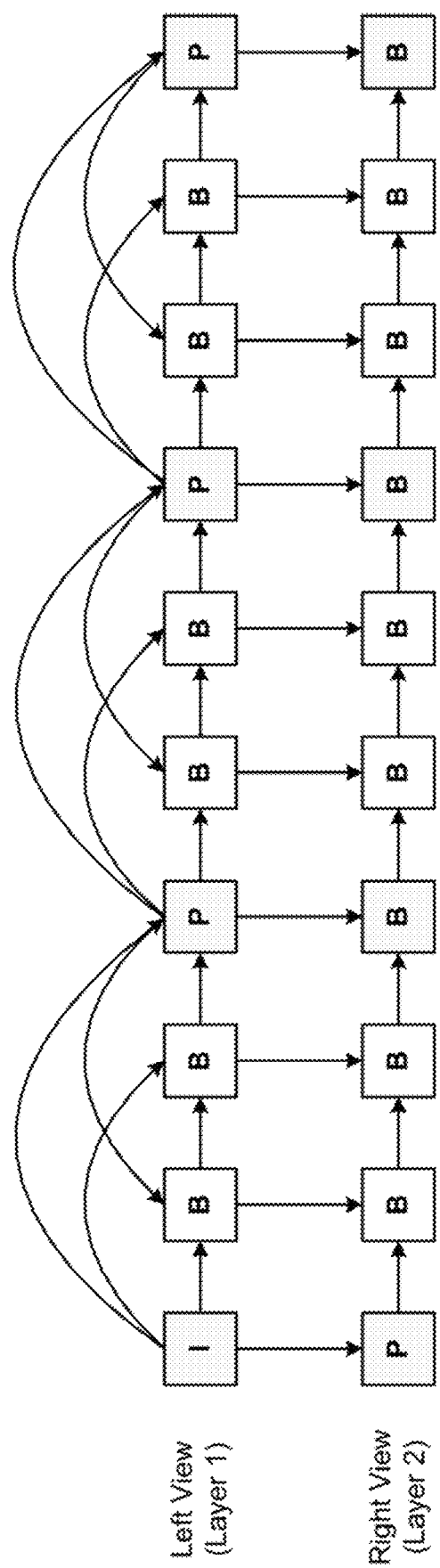
FIG. 2 depicts an example of temporal and inter-layer prediction for stereoscopic video coding.

FIG. 2 depicts an example prediction structure for using MVC to code a stereoscopic video with a left view (e.g., layer 1) and a right view (e.g., layer 2). The left view video may be coded with an I-B-B-P prediction structure, and the right view video may be coded with a P-B-B-B prediction structure. As shown in FIG. 2, in the right view, the first picture collocated with the first I picture in the left view may be coded as a P picture, and subsequent pictures in the right view may be coded as B pictures with a first prediction coming from temporal references in the right view, and a second prediction coming from inter-layer reference in the left view. MVC may not support the single loop decoding feature. For example, as shown in FIG. 2, decoding of the right view (e.g., layer 2) video may be conditioned on the availability of an entirety of pictures in the left view (layer 1), with each layer (e.g., view) having a respective compensation loop. An implementation of MVC may include high level syntax changes, and may not include block-level changes. This may ease implementation of MVC. For example, MVC may be implemented by configuring reference pictures at the slice and/or picture level. MVC may support coding of more than two views, for instance by extending the example shown in FIG. 2 to perform inter-layer prediction across multiple views.

MPEG frame compatible (MFC) video coding may provide a scalable extension to 3D video coding. For example, MFC may provide a scalable extension to frame compatible base layer video (e.g., two views packed into the same frame), and may provide one or more enhancement layers to recover full resolution views. Stereoscopic 3D video may have two views, including a left and a right view. Stereoscopic 3D content may be delivered by packing and/or multiplexing the two views into one frame, and by compressing and transmitting the packed video. At a receiver side, after decoding, the frames may be unpacked and displayed as two views. Such multiplexing of the views may be performed in the temporal domain or the spatial domain. When performed in the spatial domain, in order to maintain the same picture size, the two views may be spatially downsampled (e.g., by a factor of two) and packed in accordance with one or more arrangements. For example, a side-by-side arrangement may put the downsampled left view on the left half of the picture and the downsampled right view on the right half of the picture. Other arrangements may include top-and-bottom, line-by-line, checkerboard, etc. The arrangement used to achieve frame compatible 3D video may be conveyed by one or more frame packing arrangement SEI messages, for example. Such arrangement may achieve 3D delivery with minimal increase in bandwidth consumption.

FIG. 3 is a table of example scalability types that may be performed in video coding. One or more of the example scalability types may be implemented as inter-layer prediction processing modes. This may improve the compression efficiency of a video coding system (e.g., a video coding system in accordance with scalable extensions of high efficiency video coding (SHVC)). Bit-depth scalability, color gamut scalability, and/or chroma format scalability may be tied to base layer (BL) and enhancement layer (EL) video formats. For bit depth scalability, for example, a BL video may be in 8 bits, whereas an EL video may be higher than 8-bit. For color gamut scalability, for example, a BL video may be color graded in BT.709 color gamut, whereas an EL video may be color graded in BT.2020 color gamut. For chroma format scalability, for example, a BL video may be the YUV4:2:0 format, whereas an EL video may be in YUV4:2:2 or YUV4:4:4 format.

FIG. 4 is a table of example ultra high definition television (UHDTV) and high definition television (HDTV) technical specifications. As shown in FIG. 4, compared to the HDTV video format (e.g., as defined in ITU-R BT.709), the UHDTV video format (e.g., as defined in ITU-R BT.2020) may support larger spatial resolution (e.g., 4K×2K (3840×2160) and 8K×4K (7680×4320) resolutions), higher framerates (e.g., 120 Hz), higher sample bit depths (e.g., 10 bits or 12 bits), and a wider color gamut.

Figure 5:
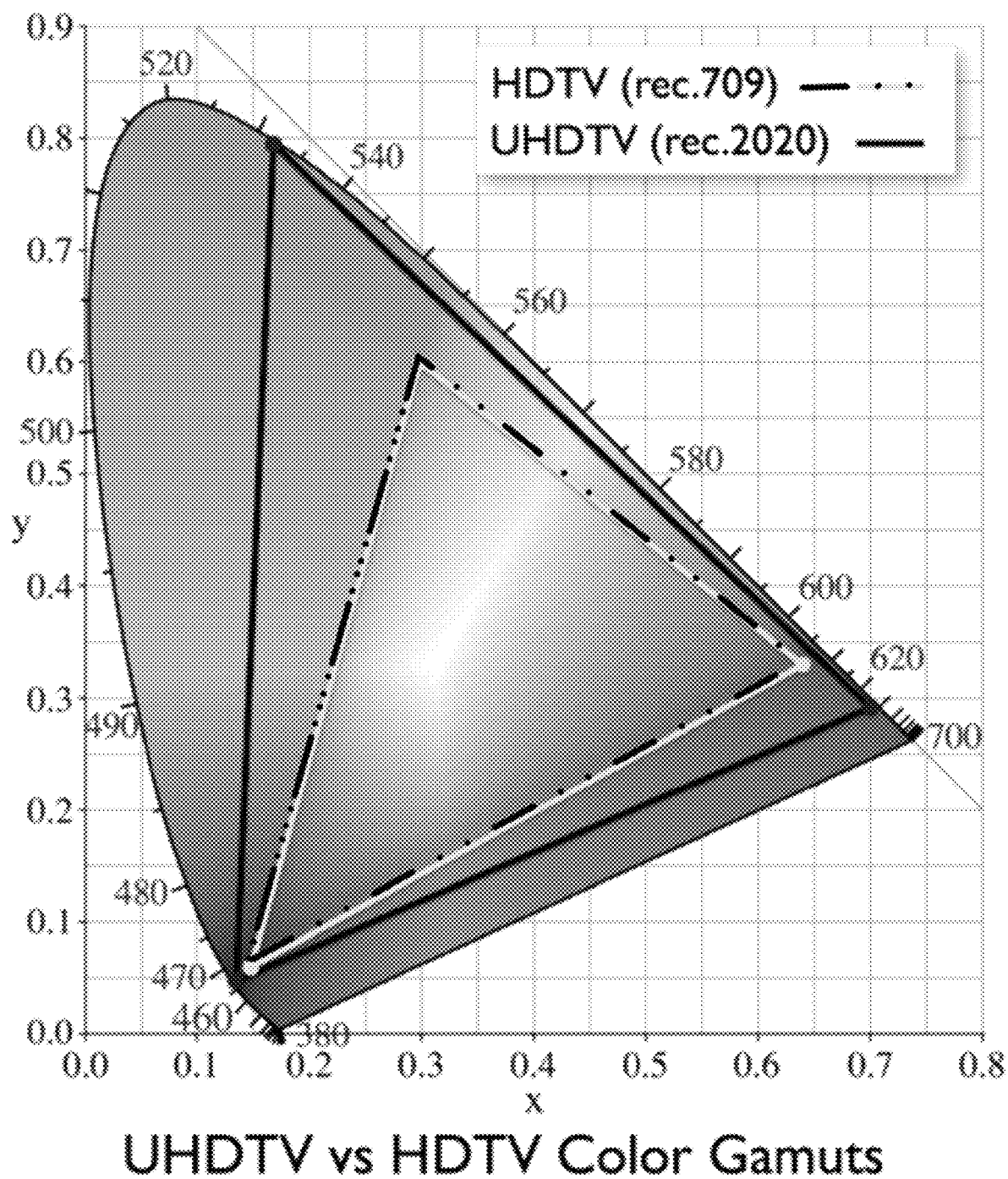
FIG. 5 depicts a comparison of ultra high definition television (UHDTV) and high definition television (HDTV) color spaces.

FIG. 5 depicts a comparison of the respective HDTV color gamut and the UHDTV color gamut in CIE color definition. As shown, the volume of colors that is covered by the UHDTV color gamut is much broader than that covered by the HDTV color gamut.

A video coding system (e.g., a video coding system in accordance with scalable extensions of high efficiency video coding (SHVC)) may include one or more devices that are configured to perform video coding. A device that is configured to perform video coding (e.g., to encode and/or decode video signals) may be referred to as a video coding device. Such video coding devices may include video-capable devices, for example a television, a digital media player, a DVD player, a Blu-ray™ player, a networked media player device, a desktop computer, a laptop personal computer, a tablet device, a mobile phone, a video conferencing system, a hardware and/or software based video encoding system, or the like. Such video coding devices may include wireless communications network elements, such as a wireless transmit/receive unit (WTRU), a base station, a gateway, or other network elements.

A video coding system may be configured to support the UHDTV display format and the HDTV display format. For example, one or more video bitstreams may be encoded in a layered manner, for example using two layers, with a base layer that represents an HDTV video signal for consumption by HDTV displays, and an enhancement layer that represents a UHDTV video signal for consumption by UHDTV displays. As shown in FIG. 4, differences between the technical specifications of the HDTV format and the UHDTV format may extend beyond spatial and temporal resolution differences, for example including sample bit depth and color gamut differences. A video coding system configured to support UHDTV may include support for spatial scalability, temporal scalability, bit depth scalability (BDS), and color gamut scalability (CGS). A video coding system may be configured to simultaneously support a plurality of scalabilities (e.g., spatial, temporal, bit depth, and color gamut scalabilities).

A video coding system may be configured to support a plurality of scalability types, for example using a scalable bitstream that includes more than two layers. Such a video coding system may be configured such that each enhancement layer enhances one video parameter. For example, FIG. 6 depicts an example bitstream layer configuration that may be used to scale an HD video signal to a UHD video signal. As shown, the example bitstream may have four layers, including a base layer (layer 0), and three enhancement layers (layer 1, layer 2, and layer 3, respectively). The base layer (layer 0) may include, for example, a 1080p60 HD video signal. In a first enhancement layer (e.g., layer 1), the spatial resolution may be scaled up, for example to 4k×2k (3840×1960). In a second enhancement layer (e.g., layer 2), the sample bit depth may be scaled up, for example from 8- to 10-bits. In a third enhancement layer (e.g., layer 3), the color gamut may be scaled up, for example from BT.709 to BT.2020. It should be appreciated that the order of bitstream layer processing depicted in FIG. 6 is an example processing order, and that other bitstream layer processing orders may be implemented. The illustrated example bitstream layer configuration does not include increasing the frame rate of the video signal. However temporal scalability may be implemented, for instance to scale the frame rate up to, for example, 120 fps in one or more of the layers. An enhancement layer may enhance more than one video parameter.

A video coding system may be configured to perform multi-loop decoding. In multi-loop decoding, in order to decode a current enhancement layer, one or more dependent layers (e.g., all dependent layers) of the current enhancement layer may be fully decoded. A decoded picture buffer (DPB) may be created in one or more of the dependent layers (e.g., each of the dependent layers). As the number of layers increases, decoding complexity (e.g., a computational complexity and/or memory consumption) may increase. The number of layers used to support desired video formats may be limited, for example in accordance with increasing decoding complexity. For example, for HD to UHD scalability, a scalable bitstream that has two layers may be implemented (e.g., the example bitstream layer configuration illustrated in FIG. 7).

Figure 8:
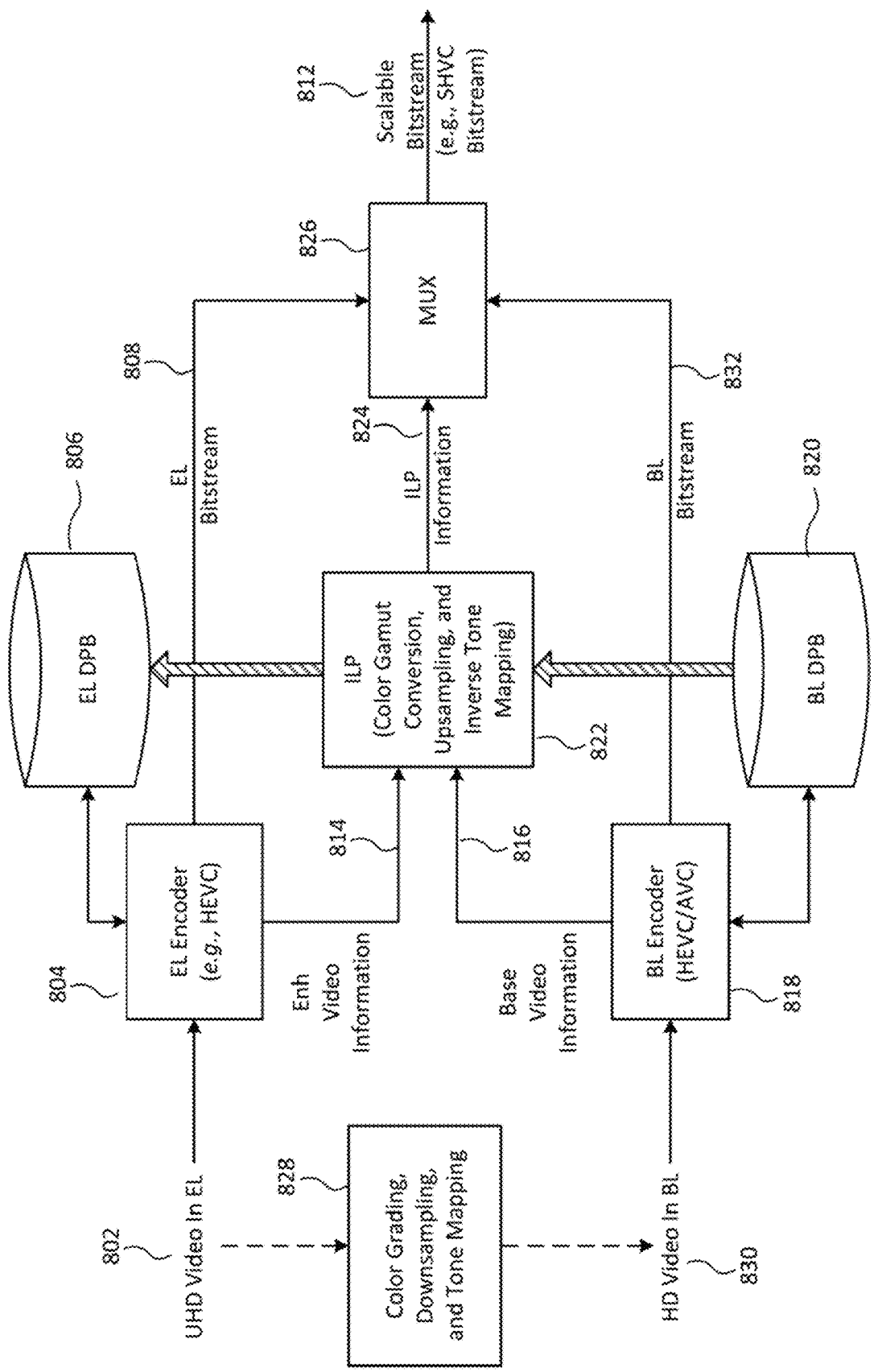
FIG. 8 is a simplified block diagram illustrating an example two-layer scalable video encoder that may be configured to perform HD to UHD scalability.

FIG. 8 is a simplified block diagram illustrating an example encoder (e.g., an SHVC encoder). The illustrated example encoder may be used to generate a two-layer HD-to-UHD scalable bitstream (e.g., as illustrated in FIG. 7). As shown in FIG. 8, the base layer (BL) video input 830 may be an HD video signal, and the enhancement layer (EL) video input 802 may be a UHD video signal. The HD video signal 830 and the UHD video signal 802 may correspond to each other, for example by one or more of: one or more downsampling parameters (e.g., spatial scalability), one or more color grading parameters (e.g., color gamut scalability), or one or more tone mapping parameters (e.g., bit depth scalability) 828.

The BL encoder 818 may include, for example, a high efficiency video coding (HEVC) video encoder or an H.264/AVC video encoder. The BL encoder 818 may be configured to generate the BL bitstream 832 using one or more BL reconstructed pictures (e.g., stored in the BL DPB 820) for prediction. The EL encoder 804 may include, for example, an HEVC encoder. The EL encoder 804 may include one or more high level syntax modifications, for example to support inter-layer prediction by adding inter-layer reference pictures to the EL DPB 806. The EL encoder 804 may be configured to generate the EL bitstream 808 using one or more EL reconstructed pictures (e.g., stored in the EL DPB 806) for prediction.

One or more reconstructed BL pictures in the BL DPB 820 may be processed, at inter-layer processing (ILP) unit 822, using one or more picture level inter-layer processing techniques, including one or more of upsampling (e.g., for spatial scalability), color gamut conversion (e.g., for color gamut scalability), or inverse tone mapping (e.g., for bit depth scalability). The one or more processed reconstructed BL pictures may be used as reference pictures for EL coding. Inter-layer processing may be performed based on enhancement video information 814 received from the EL encoder 804 and/or the base video information 816 received from the BL encoder 818.

At 826, the EL bitstream 808, the BL bitstream 832, and the parameters used in inter-layer processing such as ILP information 824, may be multiplexed together into a scalable bitstream 812. For example, the scalable bitstream 812 may include an SHVC bitstream.

Figure 9:
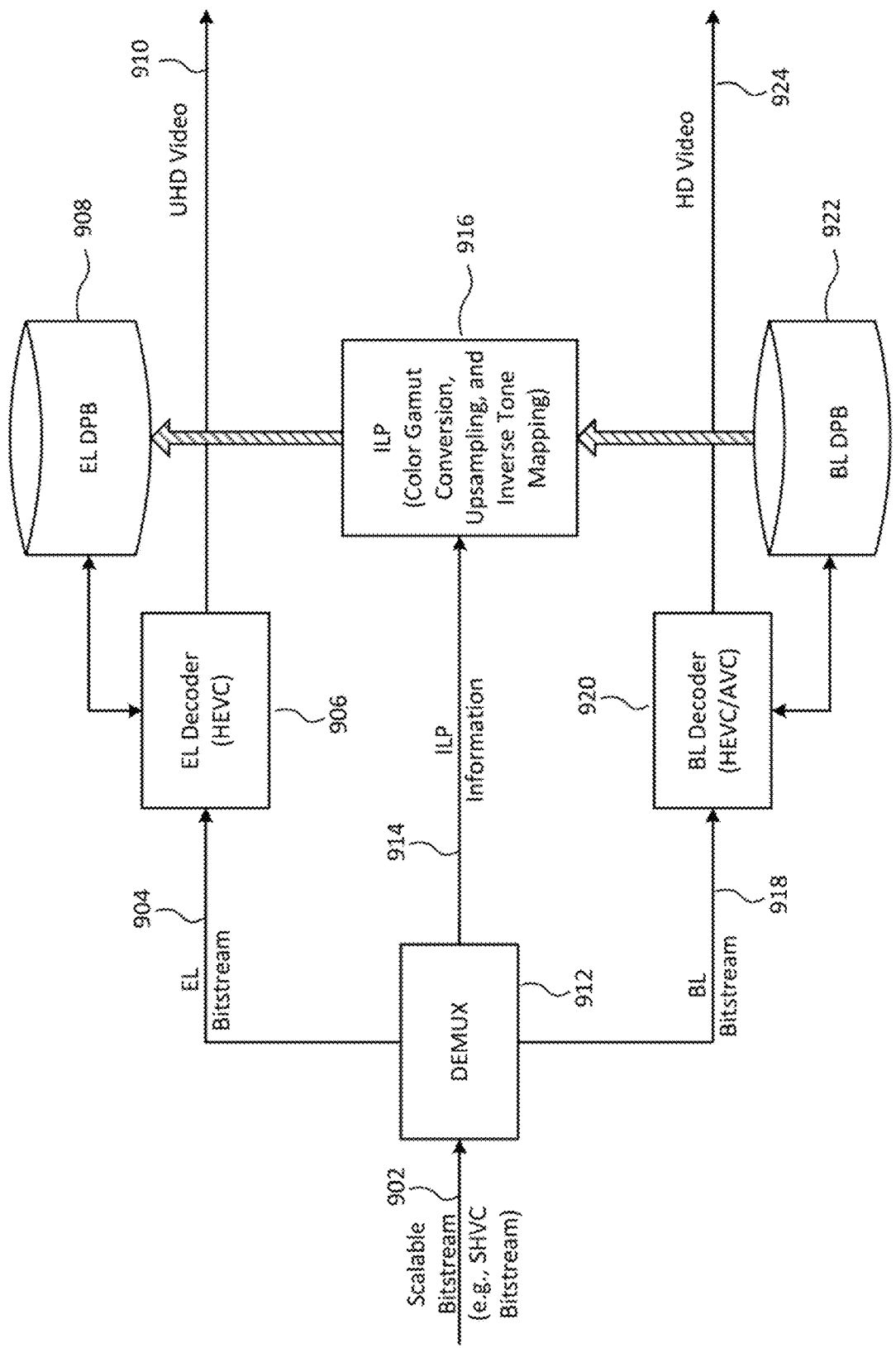
FIG. 9 is a simplified block diagram illustrating an example two-layer scalable video decoder that may be configured to perform HD to UHD scalability.

FIG. 9 is a simplified block diagram illustrating an example decoder (e.g., an SHVC decoder) that may correspond to the example encoder depicted in FIG. 8. The illustrated example decoder may be used, for example, to decode a two-layer HD-to-UHD bitstream (e.g., as illustrated in FIG. 7).

As shown in FIG. 9, a demux module 912 may receive a scalable bitstream 902, and may demultiplex the scalable bitstream 902 to generate ILP information 914, an EL bitstream 904 and a BL bitstream 918. The scalable bitstream 902 may include an SHVC bitstream. The EL bitstream 904 may be decoded by EL decoder 906. The EL decoder 906 may include, for example, an HEVC video decoder. The EL decoder 906 may be configured to generate UHD video signal 910 using one or more EL reconstructed pictures (e.g., stored in the EL DPB 908) for prediction. The BL bitstream 918 may be decoded by BL decoder 920. The BL decoder 920 may include, for example, an HEVC video decoder or an H.264/AVC video decoder. The BL decoder 920 may be configured to generate HD video signal 924 using one or more BL reconstructed pictures (e.g., stored in the BL DPB 922) for prediction. The reconstructed video signals such as UHD video signal 910 and/or HD video signal 924 may be used to drive the display device.

One or more reconstructed BL pictures in the BL DPB 922 may be processed, at ILP unit 916, using one or more picture level inter-layer processing techniques. Such picture level inter-layer processing techniques may include one or more of upsampling (e.g., for spatial scalability), color gamut conversion (e.g., for color gamut scalability), or inverse tone mapping (e.g., for bit depth scalability). The one or more processed reconstructed BL pictures may be used as reference pictures for EL decoding. Inter-layer processing may be performed based on the parameters used in inter-layer processing such as ILP information 914. The prediction information may comprise prediction block sizes, one or more motion vectors (e.g., which may indicate direction and amount of motion), and/or one or more reference indices (e.g., which may indicate from which reference picture the prediction signal is to be obtained). This may improve EL decoding efficiency.

A video coding system may perform combined inter-layer scalability processing. The video coding system may use multiple inter-layer processing modules in performing inter-layer prediction. One or more inter-layer processing modules may be combined. The video coding system may perform inter-layer processing in accordance with a cascade configuration of inter-layer processing modules. Combined inter-layer scalability processing and/or corresponding model parameters may be signaled.

An example video coding process may include performing inter-layer processing to a base layer of a video signal. A first portion of the inter-layer processing may be performed using a combined processing module that simultaneously performs first and second scalability processes. The example video coding process may include applying the processed base layer to an enhancement layer of the video signal. The first portion of the inter-layer processing may include inverse tone mapping processing and color gamut conversion processing. A second portion of the inter-layer processing may be performed using an upsampling processing module.

The video coding system may be configured to perform interlayer processing steps in a specific order, for example by causing one or more of the inter-layer processing modules to execute in a specific order. An inter-layer processing module may be responsible for executing a particular inter-layer process. One or more inter-layer processes may be combined into one or more corresponding inter-layer processing modules, such that an inter-layer processing module may perform more than one inter-layer process simultaneously. These module configurations may be associated with respective implementation complexities, computation complexities, and/or measures of scalable coding performance. An inter-layer processing module may be responsible for executing multiple inter-layer processes.

A video coding system may be configured to perform inter-layer processing in accordance with combined scalability. For example, combined scalability may be implemented in the ILP unit of a video encoder (e.g., such as the ILP unit 822 depicted in FIG. 8) and/or in the ILP unit of a video decoder (e.g., such as the ILP unit 916 depicted in FIG. 9). A plurality of processing modules may be used to implement combined scalability.

Figures 10, 11, 12:
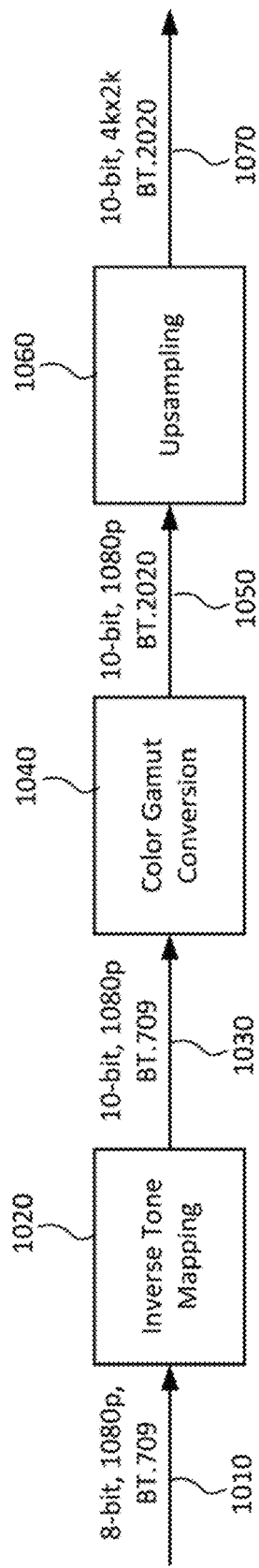
FIG. 10 depicts an example of inter-layer processing using multiple processing modules.
FIG. 11 is a syntax table that illustrates an example of signaling a selection and processing order of inter layer processes and/or inter layer processing modules.
FIG. 12 is a table of example values that may be used with the example syntax table of FIG. 11.

In an example configuration for combined scalability processing, each processing module may be configured to perform processes associated with a respective scalability type. FIG. 10 depicts an example inter-layer video coding process using a plurality of processing modules configured to perform video coding in a cascaded manner. As shown, each processing module may be configured to perform processing of a particular scalability type. The example inter-layer video coding process may be used, for example, to perform HD to UHD scalable coding. A processing module may be configured to perform processing of multiple scalability types.

As shown in FIG. 10, an inverse tone mapping module 1020 may convert 8-bit video 1010 to 10-bit video 1030. A color gamut conversion module 1040 may convert BT.709 video 1030 to BT.2020 video 1050. An upsampling module 1060 may be used to convert video in 1920×1080 spatial resolution 1050 to video in 3840×2160 spatial resolution 1070. In combination, these processing modules may fulfill the processing of the ILP unit illustrated in FIGS. 8 and 9. It should be appreciated that the processing order (e.g., order of processing modules) illustrated in FIG. 10 (inverse tone mapping, followed by color gamut conversion, followed by upsampling) is an example processing order, and that other processing orders may be implemented. For example, the order of processing modules in an ILP unit may be interchangeable.

One or more inter-layer processing modules (e.g., each inter-layer processing module) may be configured for per-sample operation. For example, the inverse tone mapping module 1020 may be applied to each sample in a video picture to convert 8-bit video to 10-bit video. Per-sample operation may be performed by the color gamut conversion module 1040. The number of samples in a video picture may increase (e.g., significantly) after the upsampling module 1060 is applied (e.g., in the case of a 2×spatial ratio, the number of samples quadruples after upsampling).

In an example implementation of combined scalability processing, an ILP unit may be configured such that processing by the upsampling module 1060 may be performed at the end of inter-layer processing (e.g., as depicted in FIG. 10).

A scalable video coding system may be implemented with multiple layers. For one or more layers (e.g., for each layer), the availability, the selection, and/or the application of the respective processes of a cascaded inter-layer processing flow may be different. For example, for one or more layers, processing may be limited to a color gamut conversion process and an upsampling process. For example, an inverse tone mapping process may be omitted. A respective selection and/or processing order of scalability conversion process (e.g., as depicted in FIG. 10), for each layer, may be signaled in a processing order (e.g. in accordance with the sample syntax table depicted in FIG. 11). This information may be encapsulated in the video parameter set (VPS) and/or the sequence parameter set (SPS) of a layer, for example. The application of one or more processes by a decoder may be limited by an indication of whether each respective process is available and/or selected for processing. This may be indicated, for example, by process availability and/or process selection information. The order of processes in inter-layer processing may be signaled, for example in the bitstream. In an embodiment, a processing order may be predefined. In an embodiment, the order of processes in inter-layer processing may be signaled in the bitstream.

Process indices corresponding to one or more applicable processes may be specified. A process index may correspond to a process or a combination of processes, and may indicate the respective process(es). For example, FIG. 12 depicts an example syntax table that defines indices which may be used for the process_index field depicted in FIG. 11. An encoder may send one or more indices to signal a selection and/or order of processing modules, for example in accordance with cascaded processing as depicted in FIG. 10. The selection may be an arbitrary selection. A decoder may receive and decode this signaling, and responsive to the signaling, may apply the selected processes in the specified order in performing inter-layer processing (e.g., using an ILP unit).

One or more additional parameters may be included in the signaling and/or in the bitstream, to specify respective module definitions. For example, how each of the processing modules may be applied may be signaled. The one or more additional parameters may specify individual and/or combined module definitions. Such parameters may be, for example, signaled as part of the ILP information.

In an example upsampling process, signaling may define, for example, one or more of a form, shape, size, or coefficients of an upsampling filter to be applied by the upsampling module. The signaling may, for example, specify a separable 2D filter or a non-separable 2D filter. The signaling may specify multiple filters. For example, such filters may be defined for upsampling luma picture components and/or chroma picture components. The filters may be defined separately or together. When combined with an inverse tone mapping process, the signaling may reflect the difference between respective input and/or output bit depths.

In an example color gamut conversion process, signaling may define, for example, one or more of a color conversion apparatus (e.g., a 3D look up table (3D-LUT)), a piecewise linear model, a cross-component linear model, a linear gain and/or offset model, or the like. For a selected model, one or more of a form, size, coefficients, or other definition parameters may be signaled. When combined with an inverse tone mapping process, the signaling may reflect the difference between respective input and/or output bit depths.

In an example inverse tone mapping process, signaling may define, for example, an input bit depth and/or an output bit depth. Multiple input and/or output bit depths may be signaled. For example, respective definitions of input and output bit depths may be signaled for a luma picture component and for one or more chroma picture components. The signaling may specify and/or may define parameters for an inverse tone mapping apparatus, such as a piecewise linear model, a polynomial model, or the like.

The example syntax table of FIG. 12 provides an example of a palette of available inter-layer processing modules that may be signaled by an encoder (e.g., the scalable video encoder of FIG. 8). One or more process index values may be signaled. A process index value may correspond to one or more inter-layer processing module(s) (e.g., for other modes of scalability). A decoder (e.g., the scalable video decoder of FIG. 9) may receive one or more process indexes via signaling from the encoder and may apply the inter-layer processing module(s) that may correspond to the received process indexes.

For example, a spatial resampling process may support aspect ratio scalability. An index corresponding to the spatial resampling process may be added to the table of FIG. 12. In an example, a chroma resampling process may support chroma format scalability. An index corresponding to the chroma resampling process may be added to the table of FIG. 12. The syntax defined by the tables of FIGS. 11 and 12 may support any number of inter-layer processing modules.

In an example implementation of combined scalability processing, an order of application for multiple inter-layer processing modules may be predetermined (e.g., agreed to and fixed between an encoder and decoder). The signaling of the table of FIG. 11 may not define a processing order, and the decoder may apply the fixed ordering to one or more selected and/or signaled processes.

In an example implementation of combined scalability processing, a selection and/or order of application for multiple inter-layer processing modules may change (e.g., with time). In such an implementation, signaling that specifies one or more of a selection of inter-layer processing modules, an order of application of the inter-layer processing modules, or respective module definitions (e.g., parameters that define each of the modules) may be transmitted and/or dynamically updated (e.g., at a picture level) of one or more scalable layers. Inter-layer processing may be changed from one picture to the next, for example using the signaling defined in the tables of FIGS. 11 and 12. For example, the definition of a 3D-LUT associated with a color gamut conversion module may change with time (e.g., to reflect differences in color tuning applied by a content provider).

In an example implementation of combined scalability processing in accordance with FIG. 10, the inter-layer processing functions may be separately implemented and may be cascaded together. For example, the inter-layer processing functions may be cascaded in an arbitrary order. Repeated access to a sample value (e.g., to each sample value) may incur high resource cost (e.g., in terms of memory access), for example, based upon the implementation (e.g., pipelining and parallelization design). Video coding and/or processing may use fixed-point operations. For example, a three dimensional lookup table (3D LUT) process may be used for color gamut conversion.

The processing modules may be combined into a single processing module such that scalable processing may be fulfilled at once. In an example implementation of combined scalability processing, the processing modules depicted in FIG. 10 may be combined into a single processing module. In such an all-in-one implementation, a pixel in the input may be accessed and processed once (or twice if separate upsampling is performed) to generate one or more corresponding pixels in the output.

Linear processing may be sufficient for some processing modules, whereas for other processing modules, non-linear processing may be more effective (e.g., in terms of improving EL coding performance). For example, upsampling using linear filters may be effective, whereas for color gamut conversion, a non-linear model (e.g., 3D LUT) may be more efficient than a linear model. Depending on a type of tone mapping used when video content is generated, an inverse tone mapping module may be linear or may be non-linear. Combining non-linear processing and linear processing may be non-trivial, and the combined module may be non-linear in nature.

Some processing modules may be used more widely than others. For example, spatial scalability may be used for applications such as video conferencing, where the sample bit depth of an input video and the color gamut may be kept the same (e.g., at 8-bit per sample and BT.709 color gamut). For applications limited to spatial scalability, inter-layer processing may include an upsampling processing module. In such an application, the upsampling processing module may be kept separate from one or more other processing modules in an ILP unit. When processing may be carried out by the upsampling processing module alone, one or more other processing modules (e.g., an inverse tone mapping processing module and/or a color gamut conversion processing module) may be bypassed.

One or more functions in an inter-layer processing unit may be aligned with one or more other parts of a video codec. For example, in accordance with an implementation of SHVC, the upsampling filters for the ½- and ¼-pixel positions may be kept the same as the interpolation filters at the corresponding phases used for motion compensated prediction in HEVC.

Figure 13:
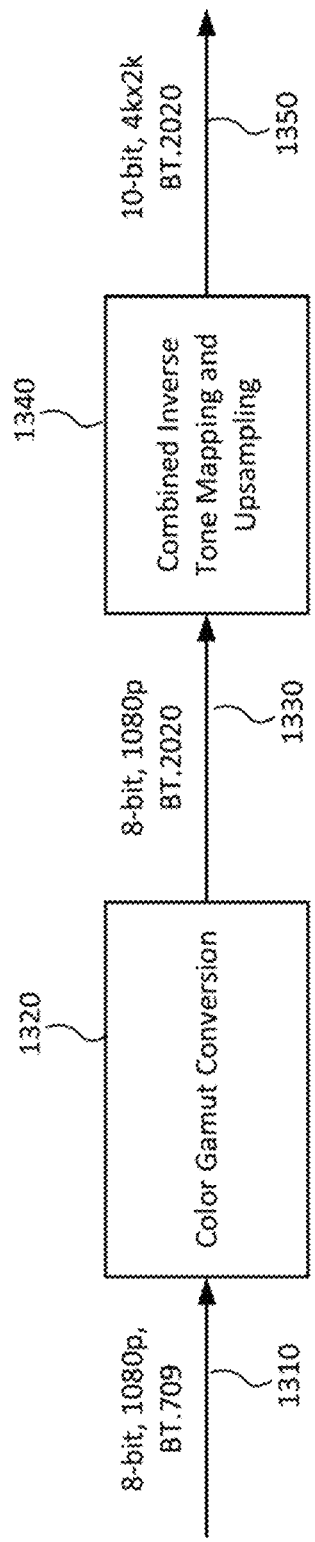
FIG. 13 depicts an example of inter-layer processing, using a combined inverse tone mapping and upsampling processing module.

FIG. 13 depicts an example implementation of combined scalability processing. One or more processing modules may be combined. As shown, the upsampling processing module may be combined with the inverse tone mapping processing module, and the color gamut conversion processing module may be kept separate (e.g., ordered before the combined upsampling and inverse tone mapping processing module).

As shown in FIG. 13, a color gamut conversion module 1320 may convert BT.709 video 1310 to BT.2020 video 1330. A combined inverse tone mapping and upsampling module 1340 may convert 8-bit in 1920×1080 spatial resolution BT.2020 video 1330 to 10-bit in 3840×2160 spatial resolution video 1350.

One or more upsampling filters may reduce a number of right shifts after filtering. To illustrate in an example implementation of SHVC, the following equation may represent a step in upsampling (e.g., vertical filtering).

$$\text{intLumaSample} = (f_L[y\text{Phase},0]*\text{tempArray}[0] + f_L[y\text{Phase},1]*\text{tempArray}[1] + f_L[y\text{Phase},2]*\text{tempArray}[2] + f_L[y\text{Phase},3]*\text{tempArray}[3] + f_L[y\text{Phase},4]*\text{tempArray}[4] + f_L[y\text{Phase},5]*\text{tempArray}[5] + f_L[y\text{Phase},6]*\text{tempArray}[6] + f_L[y\text{Phase},7]*\text{tempArray}[7] + (1<<11)) >> (12)$$

The filtering step may reduce the number of right shifts, for example depending on the value of delta_bit_depth, which may denote the difference in sample bit depth between the BL and the EL.

$$\text{intLumaSample} = (f_L[y\text{Phase},0]*\text{tempArray}[0] + f_L[y\text{Phase},1]*\text{tempArray}[1] + f_L[y\text{Phase},2]*\text{tempArray}[2] + f_L[y\text{Phase},3]*\text{tempArray}[3] + f_L[y\text{Phase},4]*\text{tempArray}[4] + f_L[y\text{Phase},5]*\text{tempArray}[5] + f_L[y\text{Phase},6]*\text{tempArray}[6] + f_L[y\text{Phase},7]*\text{tempArray}[7] + (1<<(11-\text{delta\_bit\_depth}))) >> (12-\text{delta\_bit\_depth})$$

In an embodiment, the BL and EL video content may be generated using non-linear tone mapping. The combined upsampling and inverse tone mapping process may be realized using a non-linear model, such as a polynomial model, a piece-wise linear model, etc. This may enable increased coding efficiency.

A video coding device, such as the video coding system illustrated in FIG. 1, the video encoder illustrated in FIG. 8 and/or the video decoder illustrated in FIG. 9, may code a video signal. The video coding device may perform a first inter-layer processing on a lower layer of the video signal, using a combined processing module that simultaneously performs inverse tone mapping and color gamut conversion scalability processes. The video coding device may perform a second inter-layer processing on the video signal layer, using an upsampling processing module.

Figure 14:
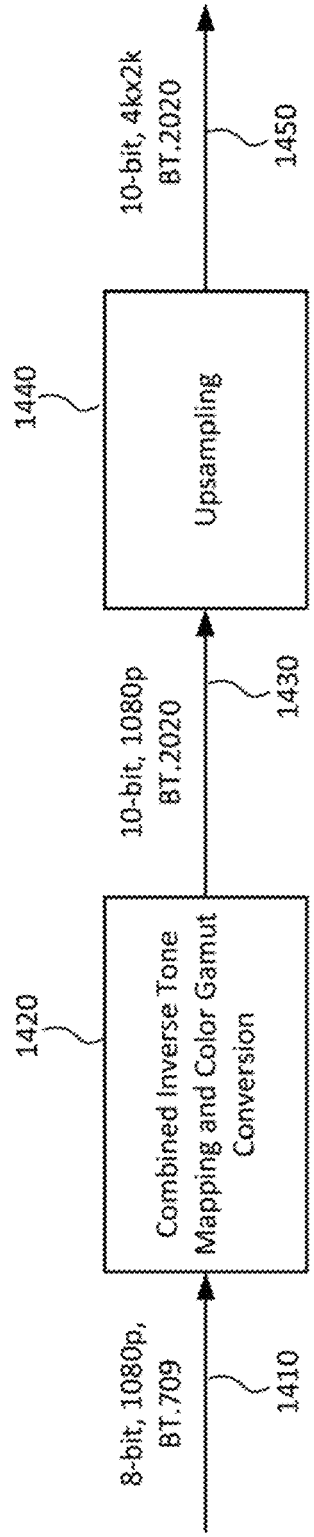
FIG. 14 depicts an example of inter-layer processing, using a combined inverse tone mapping and color gamut conversion processing module.

FIG. 14 depicts an example implementation of combined scalability processing with at least one combined processing module. As shown, the inverse tone mapping processing module may be combined with the color gamut conversion processing module and the upsampling processing module may be kept separate. A combined inverse tone mapping and color gamut conversion processing may be applied prior to the upsampling processing.

As shown in FIG. 14, combined inverse tone mapping and color gamut conversion module 1420 may convert an 8-bit BT.709 video 1410 to a 10-bit BT.2020 video 1430. The spatial resolution of the video may remain the same, such as 1920×1080 spatial resolution. The combined inverse tone mapping and color gamut conversion module 1420 may calculate a sample bit depth of an output luma component and a sample bit depth of output chroma component(s) based on a sample bit depth of an input luma component and a sample bit depth of input chroma component(s). The combined inverse tone mapping and color gamut conversion module 1420 may calculate and/or may determine the output sample bit depths based on signaling, e.g. parameters received in a video bitstream. The combined inverse tone mapping and color gamut conversion module 1420 may send the outcome, to upsampling processing module 1440. For example, an indication of the sample bit depth of the output luma component and an indication of the sample bit depth of the output chroma component(s) may be sent to the upsampling processing module 1440. The combined inverse tone mapping and color gamut conversion module 1420 may send video comprising the (e.g. converted) output luma component and output chroma components to the upsampling processing module 1440. The upsampling processing module 1440 may receive and convert the 10-bit in 1920× 1080 spatial resolution BT.2020 video 1430 to 10-bit in 3840×2160 spatial resolution BT.2020 video 1450. The upsampling process may be performed based on the sample bit depth of the output luma component and the sample bit depth of the output chroma component(s) received from the combined inverse tone mapping and color gamut conversion module 1420.

Inverse tone mapping and color gamut conversion may be more effective using non-linear models. For example, a 3D LUT may be used for color gamut conversion. Using a modified 3D LUT (e.g., with 8-bit input and 10-bit output), for example in the combined inverse tone mapping processing and color gamut conversion processing module of the example implementation depicted in FIG. 14, may be as effective as using separate non-linear models in respective separate processing modules (e.g., in accordance with the example implementation depicted in FIG. 10).

Test sequences were performed using the example implementation of combined scalability processing depicted in FIGS. 13 and 14. For the example implementation in accordance with FIG. 13, a 3D LUT technique with 8-bit input and 8-bit output was used in the color gamut conversion processing module, and a technique was used in the combined inverse tone mapping processing and upsampling processing module. For the example implementation in accordance with FIG. 14, an enhanced 3D LUT technique with 8-bit input and 10-bit output was used in the combined color gamut conversion processing and inverse tone mapping processing module, and the upsampling processing module was in accordance with an implementation of SHVC.

For the test sequences of both example implementations of combined scalability processing, the model parameters in the 3D LUT were estimated using a least square (LS) technique and a BL and EL (downsample if resolution is different) video as training sequences. Simulation results showed that both example implementations enhanced scalable coding efficiency, with the example implementation of FIG. 14 slightly outperforming the example implementation of FIG. 13. The higher coding efficiency may be attributed to the fact that the enhanced 3D LUT may absorb the inherent non-linearity of the inverse tone mapping process. Estimation and/or training of one or more model parameters for an enhanced 3D LUT that may be used in a combined processing module (e.g., the combined inverse tone mapping processing and color gamut conversion processing module of the example implementation depicted in FIG. 14) may be based, for example, on training content that may reflect an input bit depth and/or an output bit depth of the inverse tone mapping process to be performed by the combined processing module.

Inverse tone mapping processing and color gamut conversion processing may be combined using component independent linear, cross component linear, piece-wise linear, and/or polynomial with different orders. The encoder may, for example, derive model parameters with a least squares training technique based on the source content of one layer and the target content of another layer, to achieve reduced (e.g., minimal) matching errors.

Combined inter-layer scalability processing and/or corresponding model parameters may be signaled. For example, a combined scalability processing process may be signaled in the bitstream, where a syntax element may indicate which combined scalability processing process (e.g. as depicted in FIG. 13 or as depicted in FIG. 14) is to be used. This syntax element may be signaled at the sequence level, for example as part of a VPS and/or as part of an SPS. The syntax element may be signaled at the picture level, for example in the slice segment header, as part of a picture parameter set (PPS), or as part of an adaptation parameter set (APS). An encoder to choose the combined scalability processing process, for example based on the video input. The encoder may indicate the combined scalability processing process to the decoder.

In an example implementation of combined inter-layer scalability processing, the combined scalability processing process may be pre-defined. For example, the combined scalability processing process depicted in FIG. 14 may be selected. An encoder and a decoder may repeatedly use a particular combined scalability processing process, with no additional signaling.

Color gamut conversion techniques that may be used in combined inter-layer scalability processing may include one or more of gain and offset, cross component linear, piecewise linear, or 3D LUT. The example syntax table depicted in FIG. 15 illustrates an example of signaling the combined scalability processing process and parameters used for combined color gamut conversion processing and inverse tone mapping processing. The example syntax depicted in FIG. 15 may be used example in accordance with the example implementation depicted in FIG. 14.

As shown in FIG. 15, input and output bit depth values may be included as parameters of a color mapping process. The color mapping process may base the processing on a parameter indicative of the sample bit depth of the input luma component of the color mapping process. For example, the sample bit depth of the input luma component may be signaled as a delta over eight (8). For example, the parameter indicative of the sample bit depth of the input luma component may be referred to as bit_depth_input_luma_minus8, as shown in FIG. 15. Other parameter names may be used.

The color mapping process may base the processing on a parameter indicative of the sample bit depth of the input chroma component(s) of the color mapping process. For example, the sample bit depth of the input chroma component(s) may be signaled as a delta over eight (8). For example, an input chroma bit depth may be signaled as a delta over an input luma bit depth. For example, the parameter indicative of the sample bit depth of the input chroma component may be referred to as bit_depth_input_chroma_delta, as shown in FIG. 15. Other parameter names may be used. This may reduce signaling cost through reducing the value of the syntax element (e.g., small delta values) to be coded. Other bit depth signaling techniques may be used.

The color mapping process may output a parameter indicative of the sample bit depth of the output luma component of the colour mapping process. For example, the sample bit depth of the output luma component may be signaled as a delta over eight (8). For example, the sample bit depth of the output luma component may be signaled as deltas over the input luma bit depth. This output parameter may be referred to as bit_depth_output_luma_delta, as shown in FIG. 15. Other parameter names may be used.

The color mapping process may output a parameter indicative of the sample bit depth of the output chroma component(s) of the color mapping process. For example, the sample bit depth of the output chroma component(s) may be signaled as a delta over eight (8). For example, the sample bit depth of the output chroma component(s) may be signaled as deltas over the input chroma bit depth. This output parameter may be referred to as bit_depth_output_chroma_delta, as shown in FIG. 15. Other parameter names may be used.

A syntax element CGS_method may be included in the example syntax table of FIG. 15, to indicate a CGS technique used. Examples of CGS_method include gain and/or offset, cross component linear, piece-wise linear, 3D LUT, customized CGS method, and so on. After CGS_method is sent, one or more corresponding model parameters may be signaled (e.g., in accordance with respective CGS techniques). The example syntax table depicted in FIG. 15 may be included in sequence level signaling (such as in one or more of a VPS, an SPS, or a PPS). The example syntax table depicted in FIG. 15 may be included in picture level signaling (such as in one or more of a slice header or an APS).

Luma and/or chroma bit depths may be deduced from syntax elements in a VPS or an SPS. For example, in the example two-layer scalable video encoder and decoder of FIGS. 8 and 9, respectively, the BL bit depths (e.g., equivalent to the input bit depths of the combined processing module) and the EL bit depths (e.g., equivalent to the output bit depths of the combined processing module) may be retrieved from syntax elements such as bit_depth_luma/chroma_minus8 in the SPS, for example. Color gamut conversion parameters may be sent in the PPS. The parameter sets (e.g., VPS, SPS, and PPS) may be parsed and decoded independently. Signaling the bit-depth values using the example syntax table depicted in FIG. 15 may simplify parsing and decoding of the model parameters for the combined color gamut conversion and inverse tone mapping process.

The example signaling depicted in the table of FIG. 15 may serve as a process definition for a first combined inter-layer processing module corresponding, for example, to the combined inverse tone mapping processing and color gamut conversion processing module depicted in the example implementation of FIG. 14. This first combined inter-layer processing module may be used in a fixed configuration in the form of the example implementation depicted in FIG. 14. The first combined inter-layer processing module may include one inter-layer processing module available for use in a cascade processing configuration (e.g., as illustrated in FIG. 10). The selection and application of the first combined inter-layer processing module may be signaled, for example using the example syntax tables of FIGS. 11 and 12. A suitable process_index may be added to the example syntax table of FIG. 12, to indicate application of the first combined inter-layer processing module.

A combined inter-layer processing module (e.g., the combined inverse tone mapping processing and upsampling processing module depicted in the example implementation of FIG. 13) may be defined. A suitable process definition for the combined inter-layer processing module may be defined. For example, the process definition may define one or more of a form, size, shape, or coefficients of an upsampling filter for spatial scalability upsampling, and may further define one or more input bit depths and/or one or more output bit depths. A suitable process_index may be added to the example syntax table of FIG. 12, to indicate application of the second combined inter-layer processing module. The second combined inter-layer processing module may be another inter-layer processing module available for use in a cascade processing configuration (e.g., as illustrated in FIG. 10).

Any number of combined inter-layer process modules may be defined and/or incorporated into the cascade framework depicted in FIG. 10, for example using the signaling framework defined in the example syntax tables of FIGS. 11 and 12.

FIG. 16 depicts an example syntax table that illustrates a definition of process indices. As shown, a process index may correspond to combined inverse tone mapping and color gamut conversion. For example, process_index=3 may correspond to a first combined inter-layer processing module. As shown, a process index may correspond to combined inverse tone mapping and upsampling. For example, process_index=4 may correspond to a second combined inter-layer processing module.

Bit depth may be considered for color gamut conversion modules. A color gamut conversion process may convert a signal from one color space to another color space. Cross color component relationships may be applied to color gamut conversion functions. For example, in a 3D LUT based color gamut conversion, such as the color gamut conversion process adopted in the final version of scalable extensions of HEVC, the 3D color space may be partitioned into multiple octants. Within one or more octants, a cross color component linear model may be applied, such as the following:

$$\text{outputSample}X = ((LutX[yIdx][uIdx][vIdx][0]*\text{input-}\\\text{Sample}Y + LutX[yIdx][uIdx][vIdx][1]*\text{inputSam-}\\\text{ple}U + LutX[yIdx][uIdx][vIdx][2]*\text{inputSample}V +\\n\text{MappingOffset}) >> n\text{MappingShift}) + LutX[yIdx]\\{}[uIdx][vIdx][3] \quad (1).$$

Parameter outputSampleX may indicate an output sample value of the color component X (e.g., X may be Y, U, or V) after color gamut conversion. Parameter LutX[yIdx][uIdx][vIdx][i] may indicate the i-th LUT parameter for an octant specified by (yIdx, uIdx, vIdx) of the color component X, where $0 \leq i \leq 3$. Parameters nMappingShift and nMappingOffset may control the precision of the fixed point operation during color gamut conversion, and parameters inputSampleY, inputSampleU, and inputSampleV may include respective input values of the color components Y, U, and V before color gamut conversion.

In an embodiment, the respective bit depth values of the luma and chroma samples may be different. These bit depth values may be specified, for example, by bit_depth_input_luma_minus8 and bit_depth_input_chroma_delta in FIG. 15. The bit depth values may be specified, for example through parameter sets such as the VPS, the SPS, and/or the PPS. An input luma bit depth may be denoted as InputLumaBitDepth, and an input_chroma bit depth may be denoted as InputChromaBitDepth. The input luma bit depth and input_chroma bit depth may be derived. For example, the input luma bit depth and input_chroma bit depth may be derived based on the signaling illustrated in FIG. 15. The input luma bit depth and input chroma bit depth may be derived in accordance with the following:

$$\text{InputLumaBitDepth} = \text{bit\_depth\_input\_luma\_minus8} + 8 \quad (1a)$$

$$\text{InputChromaBitDepth} = \text{InputLumaBitDepth} + \text{bit\_depth\_input\_chroma\_delta} \quad (1b)$$

Video standards, such as H.264/AVC and HEVC, may allow the bit respective depths of the luma and chroma components to be different. When cross color component models are used, the bit-depths of the respective color components may be aligned when applying a cross color component linear model. For example, bit-depths of the respective color components may be aligned when applying equation (1). In accordance with an example color gamut conversion process, the luma and/or chroma sample bit depths may be aligned with respective larger bit depth values of luma and/or chroma, denoted as MaxBitDepth=max(InputLumaBitDepth, InputChromaBitDepth), before applying a cross color component model, such as equation (1). For example, DeltaMaxLumaBitDepth and DeltaMaxChromaBitDepth may be defined as follows:

$$\text{DeltaMaxLumaBitDepth} = \text{MaxBitDepth} - \text{InputLumaBitDepth}$$

$$\text{DeltaMaxChromaBitDepth} = \text{MaxBitDepth} - \text{InputChromaBitDepth}.$$

A cross color component linear model may be applied as the following:

$$\begin{aligned}
\text{outputSample}X = & ((LutX[yIdx][uIdx][vIdx][0]* \\
& (\text{inputSample}Y << \text{DeltaMaxLumaBitDepth}) + \\
& LutX[yIdx][uIdx][vIdx][1]* \\
& (\text{inputSample}U << \text{DeltaMaxChromaBitDepth}) + \\
& LutX[yIdx][uIdx][vIdx][2]* \\
& (\text{inputSample}V << \text{DeltaMaxChromaBitDepth}) + \\
& n\text{MappingOffset}) >> n\text{MappingShift}) + LutX[yIdx] \\
& [uIdx][vIdx][3] \quad (2).
\end{aligned}$$

The luma and/or chroma bit depths may be aligned with respective smaller bit depth values of luma and/or chroma, denoted as MinBitDepth=min(InputLumaBitDepth, InputChromaBitDepth) during a color conversion process. For example, DeltaMinLumaBitDepth and DeltaMinChromaBitDepth may be defined as follows:

$$\text{DeltaMinLumaBitDepth} = \text{InputLumaBitDepth} - \text{MinBitDepth}$$

$$\text{DeltaMinChromaBitDepth} = \text{InputChromaBitDepth} - \text{MinBitDepth}.$$

A cross color component linear model may be applied as the following:

$$\begin{aligned}
\text{outputSample}X = & ((LutX[yIdx][uIdx][vIdx][0]* \\
& (\text{inputSample}Y >> \text{DeltaMinLumaBitDepth}) + LutX \\
& [yIdx][uIdx][vIdx][1]* \\
& (\text{inputSample}U >> \text{DeltaMinChromaBitDepth}) + \\
& LutX[yIdx][uIdx][vIdx][2]* \\
& (\text{inputSample}V >> \text{DeltaMinChromaBitDepth}) + \\
& n\text{MappingOffset}) >> n\text{MappingShift}) + LutX[yIdx] \\
& [uIdx][vIdx][3] \quad (3).
\end{aligned}$$

The cross color component linear model may be applied such that the complexity of one or more multiplication operations in color mapping may be reduced. The bit depth of the second term of the multiplication operations in equation (3) may be smaller. This may reduce the complexity of an implementation using, for example, ASIC design.

It should appreciated that the above-described example processes that consider the possible difference between luma and chroma bit depths are not limited to implementation in 3D LUT-based color gamut conversion functions, and that the above-described example processes may be implemented in any color gamut conversion and/or tone mapping functions that use cross color component models.

The respective values of nMappingShift and/or nMappingOffset may control the precision of a fixed point operation during color gamut conversion. For example, the values of nMappingShift and nMappingOffset may be calculated as follows:

$$n\text{MappingShift} = 10 + \text{InputBitDepth}X - \text{OutputBitDepth}X \quad (4)$$

$$n\text{MappingOffset} = 1 << (n\text{MappingShift} - 1) \quad (5)$$

where InputBitDepthX and OutputBitDepthX may include the input and output bit depths, respectively, of the color component X (e.g., X may be Y, U, or V) of the color conversion process.

Respective values of InputBitDepthX may be derived for luma and chroma, for example using equations (1a) and (1b). Respective values of OutputBitDepthX may be derived for luma and chroma, for example using the following equations:

$$\text{OutputLumaBitDepth} = \text{bit\_depth\_output\_luma\_minus8} + 8 \quad (6)$$

$$\text{OutputChromaBitDepth} = \text{OutputLumaBitDepth} + \text{bit\_depth\_input\_chroma\_delta} \quad (7)$$

In an embodiment, a color conversion process that the output bit depth of a color component is larger than or equal to the input bit depth of that color component. A color conversion process may be performed from a lower quality in the BL to a higher quality in the EL, such that a value (InputBitDepthX−OutputBitDepthX) may be negative. The value nMappingShift may become smaller as the difference between input and output bit depths increases. This may correspondingly reduce the precision of fixed point calculations.

When a bit depth delta value between input and output (InputBitDepthY−OutputBitDepthY) for a luma component is different from a bit depth delta value between input and output (InputBitDepthC−OutputBitDepthC) for a chroma component, techniques may be used to calculate nMappingShift and/or nMappingOffset, for luma and/or for chroma. For example, nMappingShift may be calculated using (InputBitDepthY−OutputBitDepthY), and may be applied to one or both of luma and chroma. Or nMappingShift may be calculated using (InputBitDepthC−OutputBitDepthC), and may be applied to one or both of luma and chroma. In another example, nMappingShift and/or nMappingOffset may be calculated using the following:

$$n\text{MappingShift} = 10 + \min(\text{InputBitDepth}Y - \text{OutputBitDepth}Y, \text{InputBitDepth}C - \text{OutputBitDepth}C) \quad (8)$$

$$n\text{MappingOffset} = 1 << (n\text{MappingShift} - 1) \quad (9)$$

These values may be applied to one or both of luma and chroma components in a color conversion process. For example, the values may be used for nMappingShift and nMappingOffset in equation (2) and/or in equation (3), for instance for each color component X in {Y, U, V}.

The process described above may preserve a high amount of precision. For example, this may enable a high (e.g., maximal) fixed-point precision of a color gamut conversion process.

The herein described video coding techniques, for example employing combined scalability processing, may be implemented in accordance with transporting video in a wireless communication system, such as the example wireless communication system 100, and components thereof, depicted in FIGS. 17A-17E.

Figure 17A:
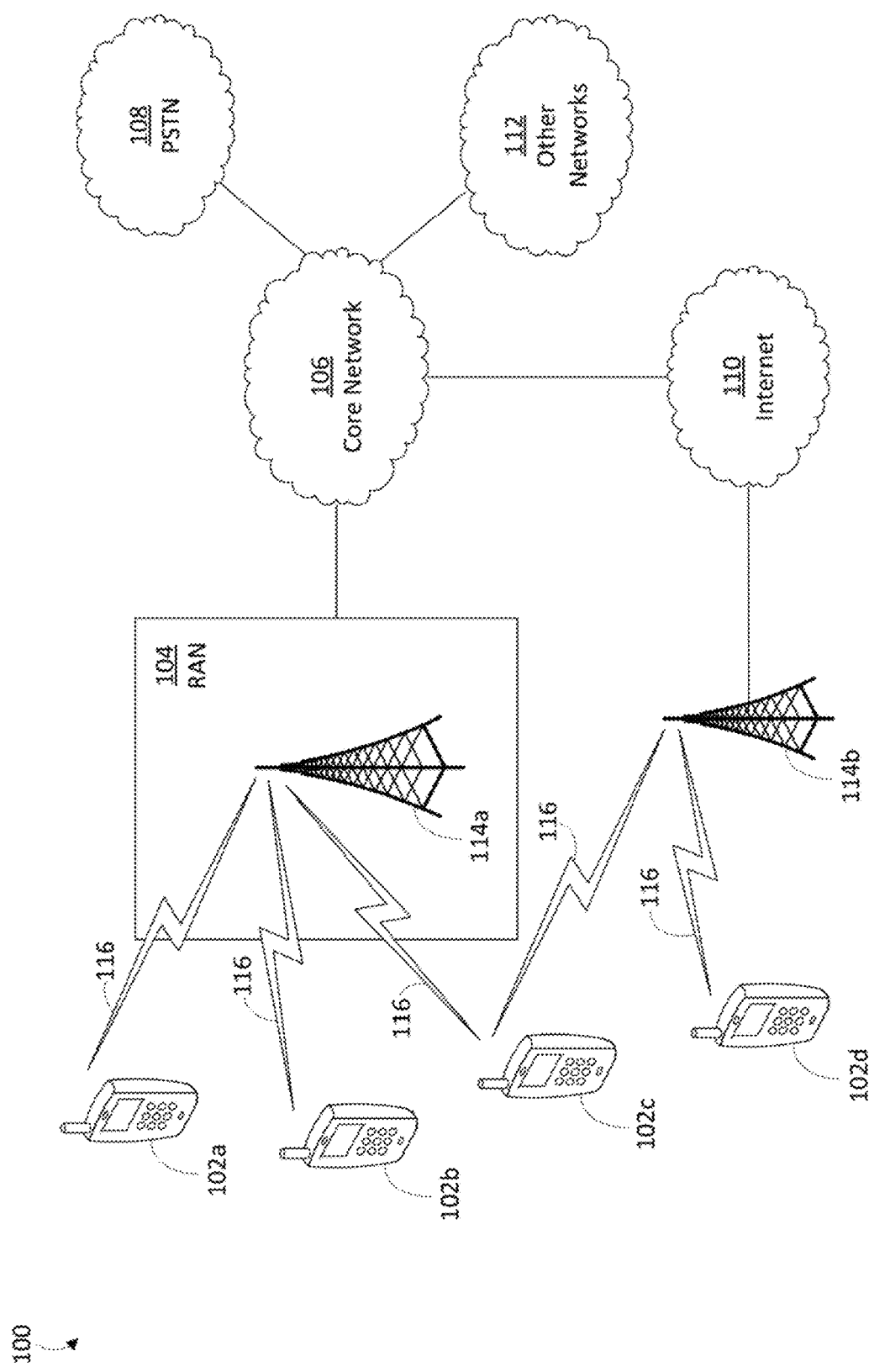
FIG. 17A depicts a system diagram of an example communications system in which one or more disclosed embodiments may be implemented.

FIG. 17A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 17A, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 17A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 17A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 17A, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 17A may be configured to communicate with the base station 114a, which may employ a cellular-based radio technology, and with the base station 114b, which may employ an IEEE 802 radio technology.

Figure 17B:
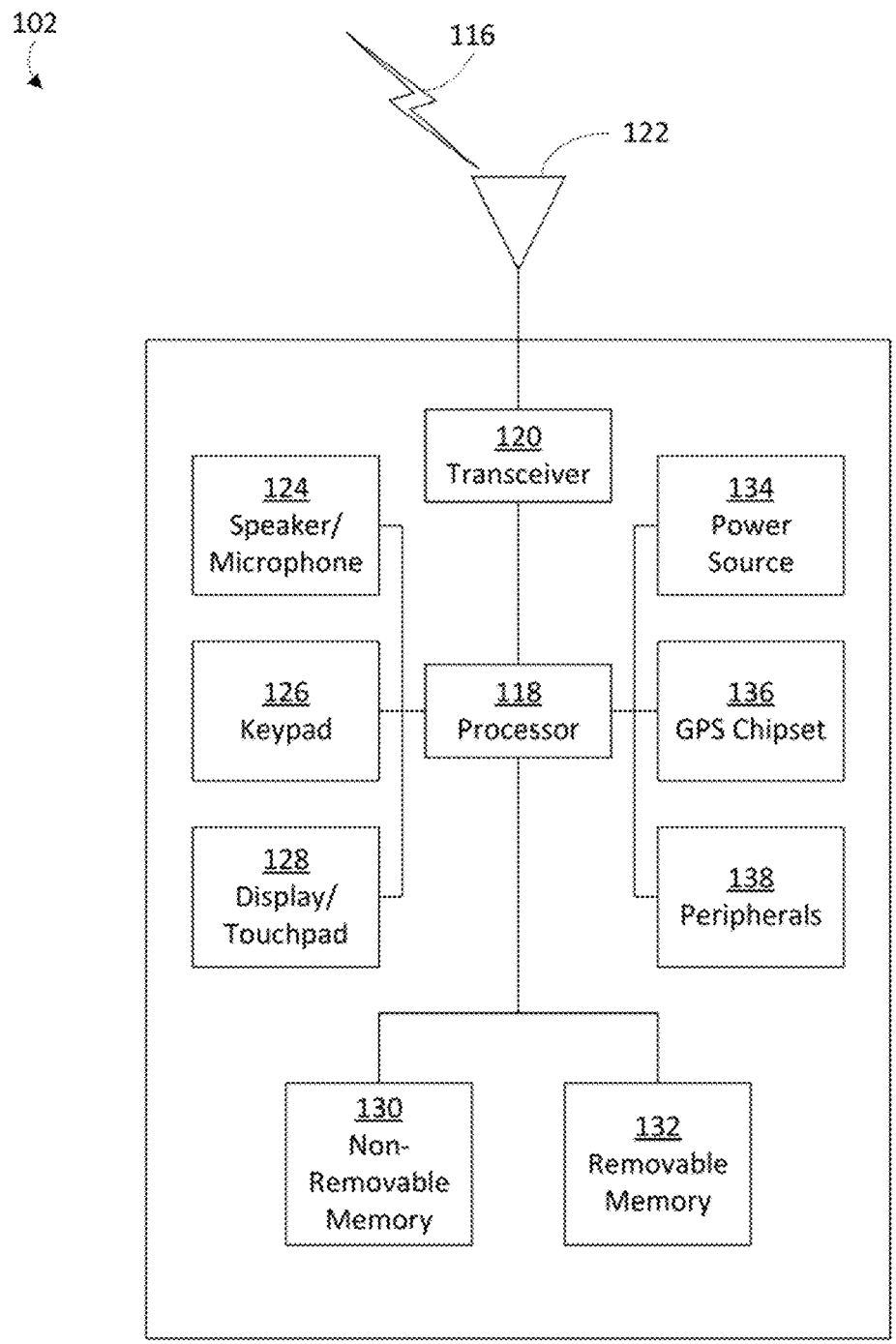
FIG. 17B depicts a system diagram of an example wireless transmit/receive unit (WTRU) that may be used within the communications system illustrated in FIG. 17A.

FIG. 17B is a system diagram of an example WTRU 102. As shown in FIG. 17B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 17B depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 17B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 17C:
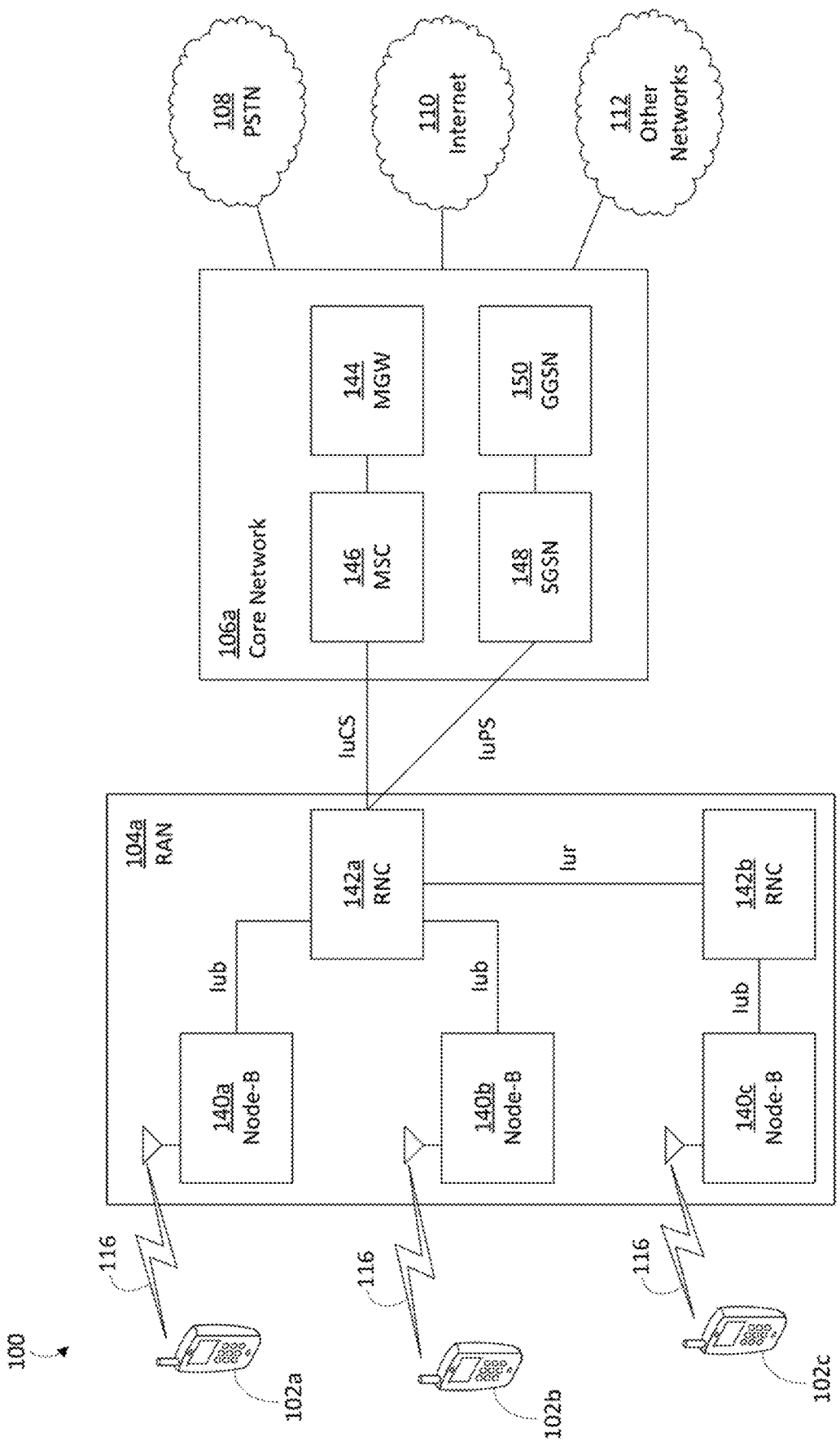
FIG. 17C depicts a system diagram of an example radio access network and an example core network that may be used within the communications system illustrated in FIG. 17A.

FIG. 17C is a system diagram of an embodiment of the communications system 100 that includes a RAN 104a and a core network 106a that comprise example implementations of the RAN 104 and the core network 106, respectively. As noted above, the RAN 104, for instance the RAN 104a, may employ a UTRA radio technology to communicate with the WTRUs 102a, 102b, 102c over the air interface 116. The RAN 104a may also be in communication with the core network 106a. As shown in FIG. 17C, the RAN 104a may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104a. The RAN 104a may also include RNCs 142a, 142b. It should be appreciated that the RAN 104a may include any number of Node-Bs and RNCs while remaining consistent with an embodiment.

As shown in FIG. 17C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106a shown in FIG. 17C may include a media gateway (MGW) 144, a mobile switching center (MSC) 146, a serving GPRS support node (SGSN) 148, and/or a gateway GPRS support node (GGSN) 150. While each of the foregoing elements is depicted as part of the core network 106a, it should be appreciated that any one of these elements may be owned and/or operated by an entity other than the core network operator.

The RNC 142a in the RAN 104a may be connected to the MSC 146 in the core network 106a via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104a may also be connected to the SGSN 148 in the core network 106a via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106a may also be connected to the networks 112, which may include other wired or wireless networks that are owned and/or operated by other service providers.

Figure 17D:
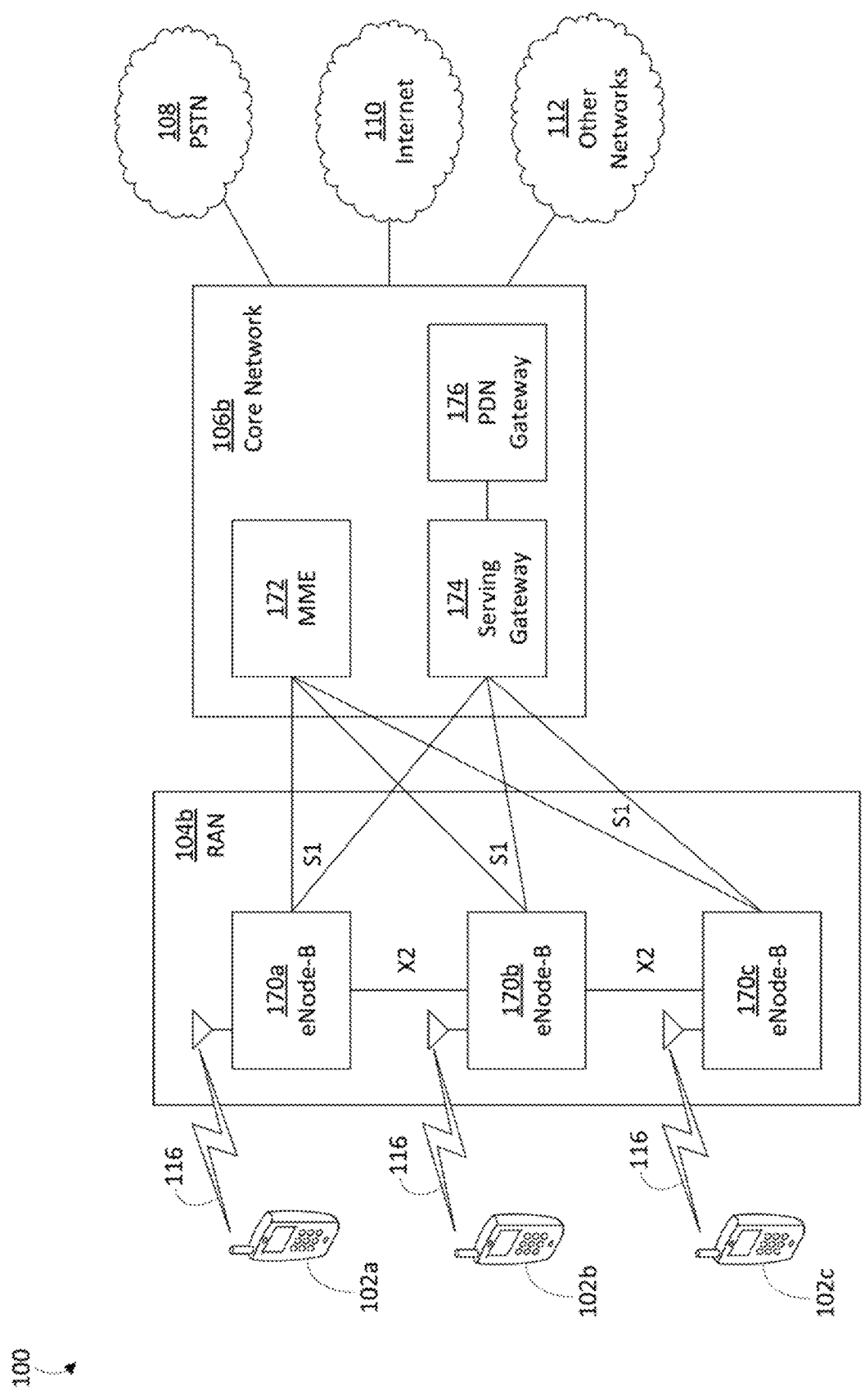
FIG. 17D depicts a system diagram of an example radio access network and an example core network that may be used within the communications system illustrated in FIG. 17A.

FIG. 17D is a system diagram of an embodiment of the communications system 100 that includes a RAN 104b and a core network 106b that comprise example implementations of the RAN 104 and the core network 106, respectively. As noted above, the RAN 104, for instance the RAN 104b, may employ an E-UTRA radio technology to communicate with the WTRUs 102a, 102b, and 102c over the air interface 116. The RAN 104b may also be in communication with the core network 106b.

The RAN 104b may include eNode-Bs 170a, 170b, 170c, though it should be appreciated that the RAN 104b may include any number of eNode-Bs while remaining consistent with an embodiment. The eNode-Bs 170a, 170b, 170c may each include one or more transceivers for communicating with the WTRUs 102a, 102b, 102c over the air interface 116. In one embodiment, the eNode-Bs 170a, 170b, 170c may implement MIMO technology. Thus, the eNode-B 170a, for example, may use multiple antennas to transmit wireless signals to, and receive wireless signals from, the WTRU 102a.

Each of the eNode-Bs 170a, 170b, 170c may be associated with a particular cell (not shown) and may be configured to handle radio resource management decisions, handover decisions, scheduling of users in the uplink and/or downlink, and the like. As shown in FIG. 17D, the eNode-Bs 170a, 170b, 170c may communicate with one another over an X2 interface.

The core network 106b shown in FIG. 17D may include a mobility management gateway (MME) 172, a serving gateway 174, and a packet data network (PDN) gateway 176. While each of the foregoing elements is depicted as part of the core network 106b, it should be appreciated that any one of these elements may be owned and/or operated by an entity other than the core network operator.

The MME 172 may be connected to each of the eNode-Bs 170a, 170b, 170c in the RAN 104b via an S1 interface and may serve as a control node. For example, the MME 172 may be responsible for authenticating users of the WTRUs 102a, 102b, 102c, bearer activation/deactivation, selecting a particular serving gateway during an initial attach of the WTRUs 102a, 102b, 102c, and the like. The MME 172 may also provide a control plane function for switching between the RAN 104b and other RANs (not shown) that employ other radio technologies, such as GSM or WCDMA.

The serving gateway 174 may be connected to each of the eNode Bs 170a, 170b, 170c in the RAN 104b via the S1 interface. The serving gateway 174 may generally route and forward user data packets to/from the WTRUs 102a, 102b, 102c. The serving gateway 174 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 174 may also be connected to the PDN gateway 176, which may provide the WTRUs 102a, 102b, 102c with access to packet-switched networks, such as the Internet 110, to facilitate communications between the WTRUs 102a, 102b, 102c and IP-enabled devices.

The core network 106b may facilitate communications with other networks. For example, the core network 106b may provide the WTRUs 102a, 102b, 102c with access to circuit-switched networks, such as the PSTN 108, to facilitate communications between the WTRUs 102a, 102b, 102c and traditional land-line communications devices. For example, the core network 106b may include, or may communicate with, an IP gateway (e.g., an IP multimedia subsystem (IMS) server) that serves as an interface between the core network 106b and the PSTN 108. In addition, the core network 106b may provide the WTRUs 102a, 102b, 102c with access to the networks 112, which may include other wired or wireless networks that are owned and/or operated by other service providers.

Figure 17E:
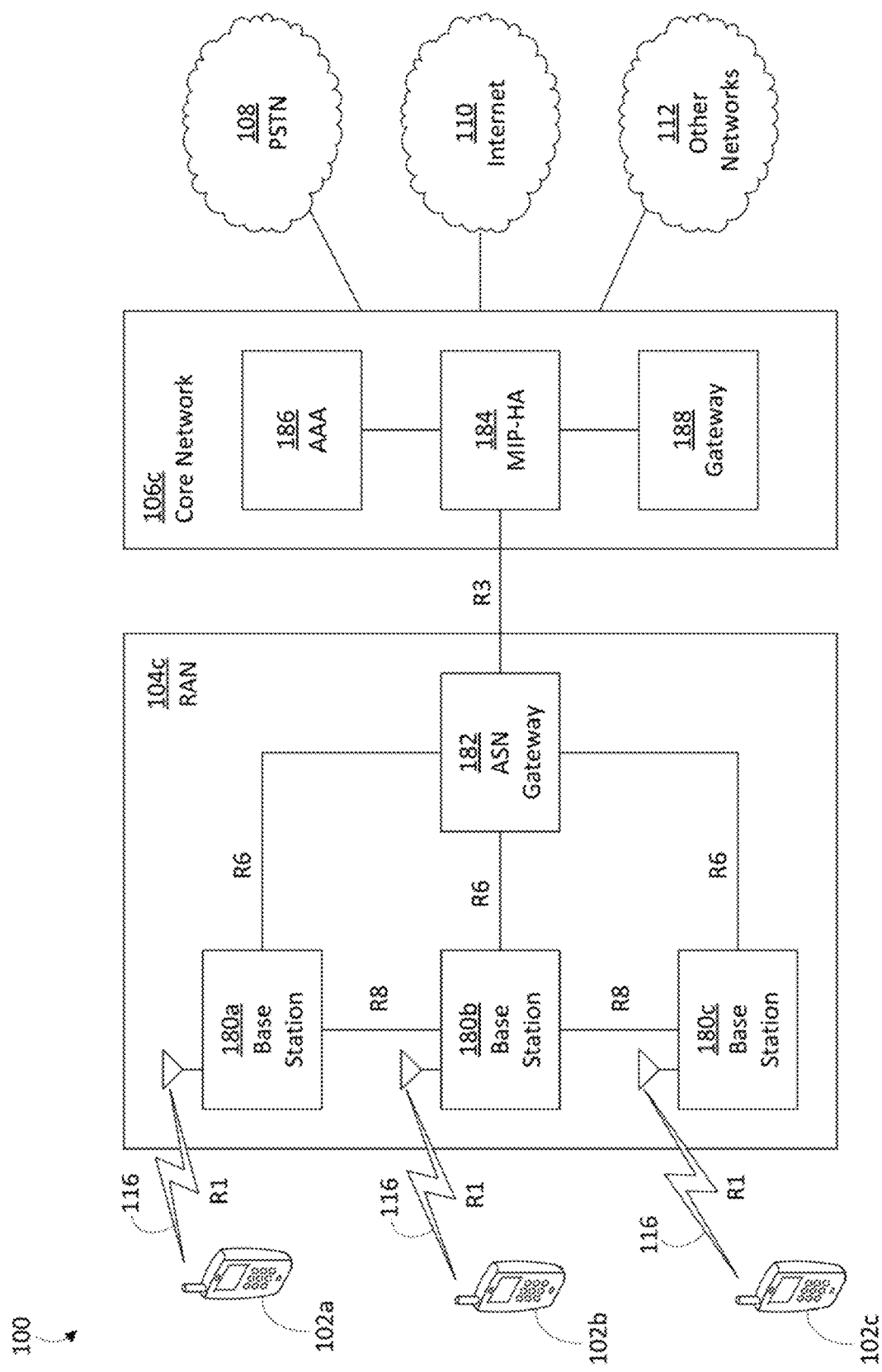
FIG. 17E depicts a system diagram of an example radio access network and an example core network that may be used within the communications system illustrated in FIG. 17A.

FIG. 17E is a system diagram of an embodiment of the communications system 100 that includes a RAN 104c and a core network 106c that comprise example implementations of the RAN 104 and the core network 106, respectively. The RAN 104, for instance the RAN 104c, may be an access service network (ASN) that employs IEEE 802.16 radio technology to communicate with the WTRUs 102a, 102b, 102c over the air interface 116. As described herein, the communication links between the different functional entities of the WTRUs 102a, 102b, 102c, the RAN 104c, and the core network 106c may be defined as reference points.

As shown in FIG. 17E, the RAN 104c may include base stations 180a, 180b, 180c, and an ASN gateway 182, though it should be appreciated that the RAN 104c may include any number of base stations and ASN gateways while remaining consistent with an embodiment. The base stations 180a, 180b, 180c may each be associated with a particular cell (not shown) in the RAN 104c and may each include one or more transceivers for communicating with the WTRUs 102a, 102b, 102c over the air interface 116. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN Gateway 182 may serve as a traffic aggregation point and may be responsible for paging, caching of subscriber profiles, routing to the core network 106c, and the like.

The air interface 116 between the WTRUs 102a, 102b, 102c and the RAN 104c may be defined as an R1 reference point that implements the IEEE 802.16 specification. In addition, each of the WTRUs 102a, 102b, 102c may establish a logical interface (not shown) with the core network 106c. The logical interface between the WTRUs 102a, 102b, 102c and the core network 106c may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 17E, the RAN 104c may be connected to the core network 106c. The communication link between the RAN 104c and the core network 106c may defined as an R3 reference point that includes protocols for facilitating data transfer and mobility management capabilities, for example. The core network 106c may include a mobile IP home agent (MIP-HA) 184, an authentication, authorization, accounting (AAA) server 186, and a gateway 188. While each of the foregoing elements is depicted as part of the core network 106c, it should be appreciated that any one of these elements may be owned and/or operated by an entity other than the core network operator.

The MIP-HA 184 may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. In addition, the gateway 188 may provide the WTRUs 102a, 102b, 102c with access to the networks 112, which may include other wired or wireless networks that are owned and/or operated by other service providers.

Although not shown in FIG. 17E, it should be appreciated that the RAN 104c may be connected to other ASNs and the core network 106c may be connected to other core networks. The communication link between the RAN 104c the other ASNs may be defined as an R4 reference point, which may include protocols for coordinating the mobility of the WTRUs 102a, 102b, 102c between the RAN 104c and the other ASNs. The communication link between the core network 106c and the other core networks may be defined as an R5 reference point, which may include protocols for facilitating interworking between home core networks and visited core networks.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer. Features and/or elements described herein in accordance with one or more example embodiments may be used in combination with features and/or elements described herein in accordance with one or more other example embodiments.

What is claimed:

1. A method of decoding a video signal, the method comprising:
   receiving the video signal;
   reconstructing a picture from the video signal;
   performing bit depth alignment on a luma component of the picture and a chroma component of the picture such that the luma and chroma components have a same aligned bit depth; and
   performing color mapping on the bit depth-aligned luma and chroma components of the picture.

2. The method of claim 1, wherein performing bit depth alignment further comprises:

aligning a first bit depth of the luma component to a second bit depth of the chroma component.

3. The method of claim 1, wherein performing bit depth alignment further comprises:
aligning a first bit depth of the chroma component to a second bit depth of the luma component.

4. The method of claim 1, wherein performing bit depth alignment further comprises:
determining a maximum color component bit depth based on a first bit depth of the luma component and a second bit depth of the chroma component; and
aligning the first bit depth of the luma component and the second bit depth of the chroma component to the maximum color component bit depth.

5. The method of claim 4, wherein the maximum color component bit depth is the greater of the first bit depth of the luma component and the second bit depth of the chroma component.

6. The method of claim 1, wherein performing bit depth alignment further comprises:
determining a minimum color component bit depth based on a first bit depth of the luma component and a second bit depth of the chroma component; and
aligning the first bit depth of the luma component and the second bit depth of the chroma component to the minimum color component bit depth.

7. The method of claim 6, wherein the minimum color component bit depth is the less of the first bit depth of the luma component and the second bit depth of the chroma component.

8. The method of claim 1, wherein the video signal comprises a base layer (BL) and an enhancement layer (EL), the picture is a BL picture from the BL, and performing color mapping on the bit depth-aligned luma and chroma components of the BL picture further comprises:
applying a cross color component model to the bit depth-aligned luma and chroma components to generate an inter-layer reference picture, wherein the inter-layer reference picture is used to predict at least one EL picture from the EL of the video signal.

9. The method of claim 1, wherein performing bit depth alignment further comprises:
determining a luma delta bit depth based on a first bit depth of the luma component and a second bit depth of the chroma component; and
shifting a luma sample value for the luma component by the determined luma delta bit depth.

10. The method of claim 1, wherein performing bit depth alignment further comprises:
determining a bit depth difference between a first bit depth of the luma component and a second bit depth of the chroma component; and
scaling a sample value for color component with a lower bit depth to match the bit depth of the color component with a higher bit depth.

11. A video decoding device comprising:
a processor configured to:
receive video signal;
reconstruct a picture from the video signal;
perform bit depth alignment on a luma component of the picture and a chroma component of the picture such that the luma and chroma components have a same aligned bit depth; and
perform color mapping on the bit depth-aligned luma and chroma components of the picture.

12. The video decoding device of claim 11, wherein the processor is configured to perform bit depth alignment by:
aligning a first bit depth of the luma component to a second bit depth of the chroma component.

13. The video decoding device of claim 11, wherein the processor is configured to perform bit depth alignment by:
aligning a first bit depth of the chroma component to a second bit depth of the luma component.

14. The video decoding device of claim 11, wherein the processor is configured to perform bit depth alignment by:
determining a maximum color component bit depth based on a first bit depth of the luma component and a second bit depth of the chroma component; and
aligning the first bit depth of the luma component and the second bit depth of the chroma component to the maximum color component bit depth.

15. The video decoding device of claim 14, wherein the maximum color component bit depth is the greater of the first bit depth of the luma component and the second bit depth of the chroma component.

16. The video decoding device of claim 11, wherein the processor is configured to perform bit depth alignment by:
determining a minimum color component bit depth based on a first bit depth of the luma component and a second bit depth of the chroma component; and
aligning the first bit depth of the luma component and the second bit depth of the chroma component to the minimum color component bit depth.

17. The video decoding device of claim 16, wherein the minimum color component bit depth is the less of the first bit depth of the luma component and the second bit depth of the chroma component.

18. The video decoding device of claim 11, wherein video signal comprises a base layer (BL) and an enhancement layer (EL), the picture is BL picture from the BL, and the processor is configured to perform color mapping on the bit depth-aligned luma and chroma components of the BL picture by:
applying a cross color component model to the bit depth-aligned luma and chroma components to generate an inter-layer reference picture, wherein the inter-layer reference picture is used to predict at least one EL picture from the EL of the video signal.

19. The video decoding device of claim 11, wherein the processor is configured to perform bit depth alignment by:
determining a luma delta bit depth based on a first bit depth of the luma component and a second bit depth of the chroma component; and
shifting a luma sample value for the luma component by the determined luma delta bit depth.

20. The video decoding device of claim 11, wherein the processor is configured to perform bit depth alignment by:
determining a bit depth difference between a first bit depth of the luma component and a second bit depth of the chroma component; and
scaling a sample value for a color component with a lower bit depth to match the bit depth of the color component with a higher bit depth.

21. A method of encoding a video signal, the method comprising:
receiving a picture from the video signal;
performing bit depth alignment on a luma component of the picture and a chroma component of the picture such that the luma and chroma components have a same aligned bit depth;
performing color mapping on the bit depth-aligned luma and chroma components of the picture; and
encoding the picture from the video signal.

22. The method of claim 21, further comprising:
aligning a first bit depth of the luma component to a second bit depth of the chroma component.

23. The method of claim 21, further comprising:
aligning a first bit depth of the chroma component to a second bit depth of the luma component.

24. A video encoding device comprising:
a processor configured to:
  receive a picture from a video signal;
  perform bit depth alignment on a luma component of the picture and a chroma component of the picture such that the luma and chroma components have a same aligned bit depth;
  perform color mapping on the bit depth-aligned luma and chroma components of the picture; and
  encode the picture from the video signal.

25. The video encoding device of claim 24, wherein the processor is further configured to:
  determine a maximum color component bit depth based on a first bit depth of the luma component and a second bit depth of the chroma component; and
  align the first bit depth of the luma component and the second bit depth of the chroma component to the maximum color component bit depth.

26. The video encoding device of claim 24, wherein the processor is further configured to:
  determine a minimum color component bit depth based on a first bit depth of the luma component and a second bit depth of the chroma component; and
  align the first bit depth of the luma component and the second bit depth of the chroma component to the minimum color component bit depth.

* * * * *